US006345047B1

(12) United States Patent
Regnier

(10) Patent No.: US 6,345,047 B1
(45) Date of Patent: Feb. 5, 2002

(54) COMPUTER TELEPHONY ADAPTER AND METHOD

(75) Inventor: Jean Michel Regnier, Laval (CA)

(73) Assignee: Northern Telecom Limited, Montreal (CA)

( * ) Notice: Subject to any disclaimer, the term of this patent is extended or adjusted under 35 U.S.C. 154(b) by 0 days.

(21) Appl. No.: 09/096,468

(22) Filed: Jun. 12, 1998

(51) Int. Cl.⁷ .............................................. H04L 12/66
(52) U.S. Cl. ....................... 370/352; 370/351; 370/353; 370/354; 370/356
(58) Field of Search ................................. 370/351, 352, 370/353, 354, 355, 356, 401, 410, 422, 463, 468

(56) References Cited

U.S. PATENT DOCUMENTS

| | | | | |
|---|---|---|---|---|
| 5,812,786 A | * | 9/1998 | Seazholtz et al. | 709/233 |
| 6,028,867 A | * | 2/2000 | Rawson et al. | 370/463 |
| 6,081,509 A | * | 6/2000 | Magiros et al. | 370/241 |
| 6,081,517 A | * | 6/2000 | Liu et al. | 370/352 |
| 6,118,780 A | * | 9/2000 | Dunn et al. | 370/355 |
| 6,125,177 A | * | 9/2000 | Whittaker | 379/243 |
| 6,130,893 A | * | 10/2000 | Whittaker et al. | 370/420 |
| 6,226,361 B1 | * | 5/2001 | Koyama | |
| 6,229,810 B1 | * | 5/2001 | Gerszberg et al. | 370/401 |

OTHER PUBLICATIONS

Hansson, A. "Phone Doubler—A step towards integrated Internet and telephone communities", Ericsson Review No. 4, 1997.

Schoen, U., et al., "Convergence Between Public Switching and the Internet", IEEE Communications Magazine, pp. 50–65, Jan. 1998.

Quicknet Internet Phonejack, Product Description pages from website at http:www.phonezone.com, Jan. 1998.

THiiN Line Network Utility Box shown at DEMO 98, Data General Corporation, Press Release dated Feb. 2, 1998.

* cited by examiner

Primary Examiner—Wellington Chin
Assistant Examiner—Brenda H. Pham
(74) Attorney, Agent, or Firm—Angela C. de Wilton

(57) ABSTRACT

For use at a subscriber site with a subscriber line, for simultaneously sending a telephone call from a PSTN compatible telephone terminal on the subscriber site, and IP packets from a first computer, over the subscriber line, the adaptor has a converter for converting signals from the telephone terminal into IP packets, and a multiplexer, for sending simultaneously the IP packets representing the telephone call and those from the computer, along the subscriber line. The adaptor is also arranged to handle calls without conversion to IP packets, when the subscriber telephone line is not used for carrying IP packets. Using one subscriber line, all phones in a household can remain operational, to make and receive calls, while one or more PCs are concurrently accessing online services, without needing a second line, or special equipment to increase the bandwidth transmissible over the line.

18 Claims, 10 Drawing Sheets

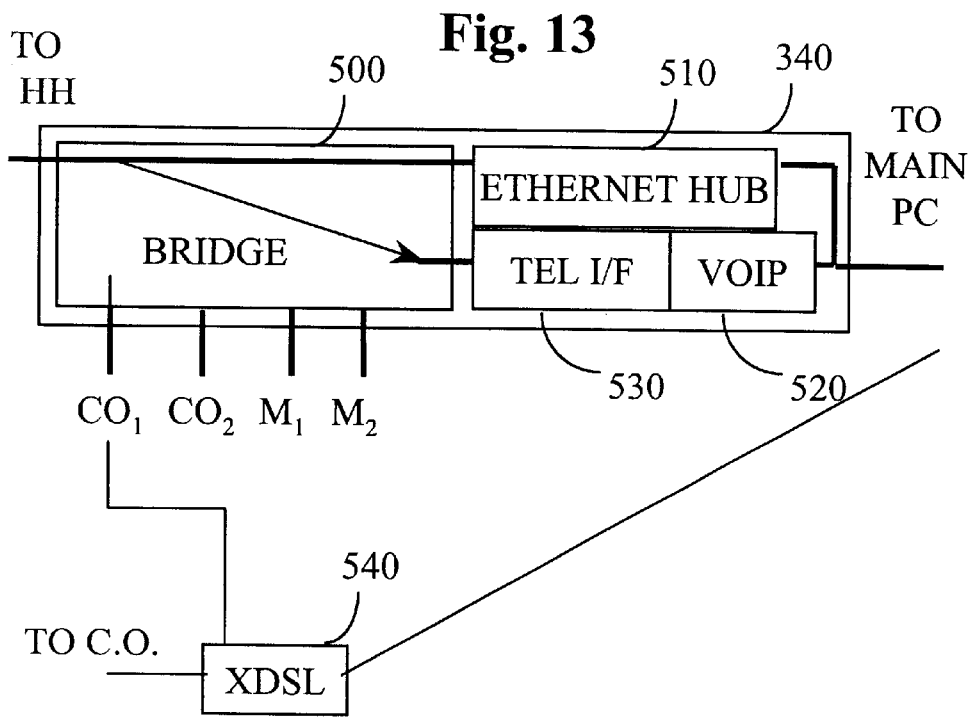
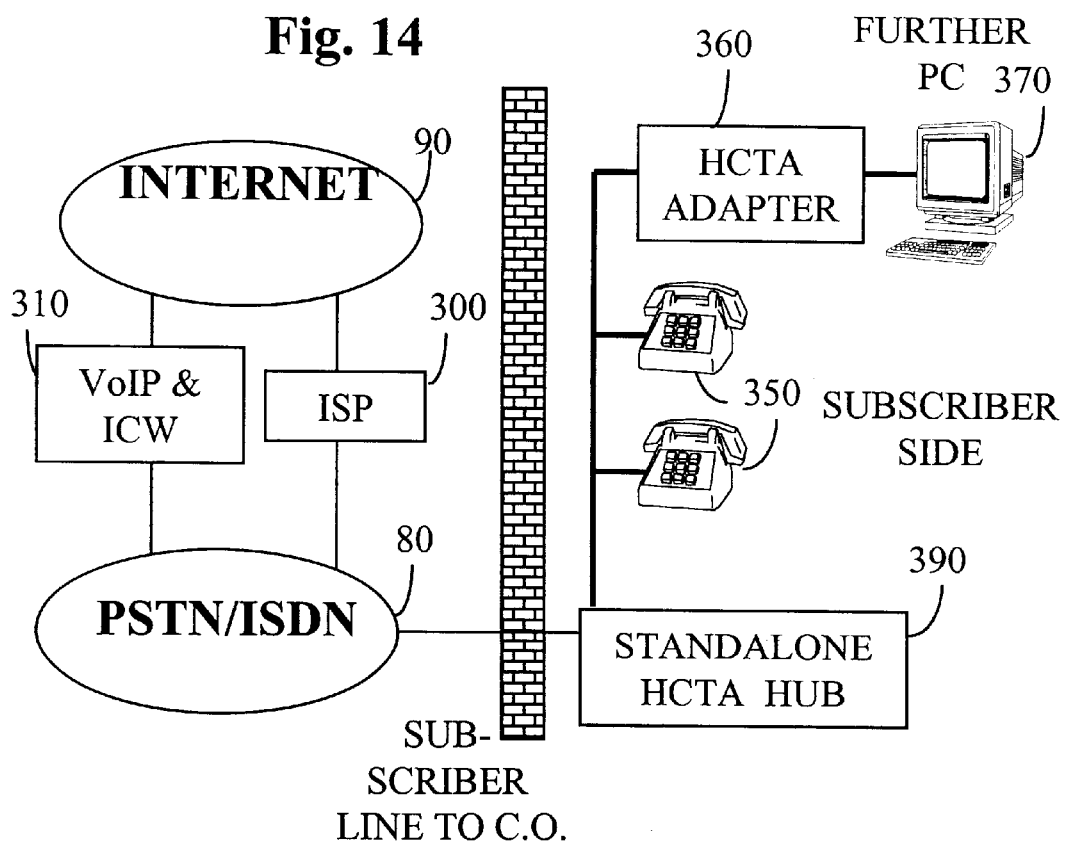

COMPUTER TELEPHONY ADAPTER AND METHOD

BACKGROUND TO THE INVENTION

1. Field of the invention

The invention relates to apparatus for simultaneously sending a telephone call over a subscriber telephone line from a PSTN compatible telephone terminal on a subscriber site, and IP packets from a first computer, to apparatus for simultaneously receiving a telephone call to a PSTN compatible telephone terminal on the subscriber site, and IP packets directed to a first computer, both sent over a subscriber telephone line, to methods of using such apparatus, and to software for carrying out such methods.

2. Background Art

The most common way of accessing on-line services using the Internet is via a modem link over a dial-up PSTN connection. However, this may tie up the user's telephone line for long periods. Incoming and outgoing voice telephone calls cannot be made or completed. Similarly, when the telephone line is being used for a voice telephone call, the Internet cannot be accessed.

One known solution to this problem is to have a second line installed. However, additional expense is involved and the second line may be accessible from only one room in the house or small office, unless major rewiring work is carried out to make both lines accessible in many rooms.

An alternative solution is called the Internet Phonejack. This is a telephony expansion card which can be plugged into a PC, and enables Internet telephony applications such as Microsoft Netmeeting to interface with conventional telephone terminals. The card emulates an ordinary subscriber telephone line, and thus enables such telephone terminals to be used for voice calls at the same time as the computer user is accessing the Internet. The analog voice signals are converted into Internet Protocol (IP) packets which can be interleaved with IP packets used by the computer for accessing other services over the Internet simultaneously.

Another known system is called the Phone Doubler, produced by Ericsson. FIG. 1 illustrates this known arrangement in schematic form. A user's PC (Personal Computer) 20 is connected to a subscriber telephone line using a modem 40. Phone doubler client software 30 runs on the PC. A headset 10 with microphone and earphone is connected to the PC.

Away from the subscriber's location, the rest of the PSTN/ISDN 50 links other elements of the arrangement. A VOIP (Voice over Internet Protocol) gateway 70 is connected to the PSTN and to an Internet access server 80. The VOIP gateway and the Internet access server may be co-located and connected by a local area network such as an ethernet link. The Internet access server is linked to the rest of the Internet 90, and also to the PSTN.

In operation, when an incoming call from a remote telephone 60 is routed by the PSTN to the subscriber with the PC 20, if the subscriber is already connected to the Internet over his subscriber line, the local central office (not shown) in the PSTN will be arranged to divert the call to the phone doubler VOIP gateway, assuming the subscriber has previously subscribed to this phone doubler service. The VOIP gateway will receive the call and will look up the IP address of the subscriber, based on the telephone number of the subscriber which has been dialed from the remote telephone 60. The gateway determines if the user already has an IP session with the Internet access server, and if so, communicates with the phone doubler client software 30 to offer the user the option of taking the call.

If the user accepts the call, the gateway converts the incoming voice signals into UDP (User Datagram Protocol) format, which uses IP for transmission. The phone doubler client 30 receives the IP packets, assembles the UDP datagrams, converts them back into the analog voice signals, which are fed to the headset 10. Voice signals from the subscriber can be transmitted in a corresponding way back to the remote telephone 60. This achieves a virtual second line for a user, to enable simultaneous voice and on-line access over a single subscriber line.

It is also known to provide systems to enable multiple computers to access the Internet over a single subscriber line simultaneously. The multiple computers may be connected over a local area network (LAN), and an Internet LAN bridge can be used to enable multiple LAN users to share a single dial-up Internet connection at the same time.

Another known system, called HomeRun has been proposed by TUT Systems, and uses existing telephone wiring in the home or office to create an ethernet LAN. It has been proposed to use this to provide Internet access throughout the home or office by linking all the computers to a modem which can maintain a single dial up connection to an ISP (Internet Service Provider), by creating a LAN over the existing telephone wiring. The networking signals and standard telephone service can coexist on the same wires at the same time, using frequency division multiplexing. Ordinary telephones can be used without alteration. PCs can be plugged in to the telephone sockets using interface cards which support a standard RJ11 phone jack, and include an ethernet interface.

It is also known to modify the equipment at each end of the subscriber telephone line to provide a higher bandwidth service over the subscriber line, e.g. 128 kbps for ISDN (Integrated Services Digital Network) or higher for xDSL (High Speed Digital Subscriber Line) type systems. For an ISDN line, two channels are multiplexed over a single physical path. The interfaces at each end may be arranged so that voice calls use one of the two channels, while the other may be used to carry data, to enable online services to be accessed simultaneously. xDSL encompasses a range of different types of digital subscriber line systems including ADSL (Asynchronous Digital Subscriber Line), requiring specialized equipment at both ends of the subscriber line.

In this document, PSTN compatible telephone terminals shall be defined as excluding ISDN or ADSL compatibility. PSTN compatible is intended to encompass compatibility with a basic public telephone service interface. Such terminals use a conventional tip and ring analog interface, for use with one 64 kbit channel in the PSTN network. They may have a wired handset or a cordless handset, or a speaker phone, for example.

The term IP is intended to encompass any version of the Internet Protocol and any other protocols which may be used for carrying Internet traffic with ISO layer three functions.

SUMMARY OF THE INVENTION

It is an object of the invention to provide improved methods and apparatus.

According to a first aspect of the invention there is provided apparatus for use with a subscriber telephone line connecting a subscriber site and a telephone network, for simultaneously sending a telephone call from a PSTN compatible telephone terminal on the subscriber site, and IP packets from a first computer, over the subscriber telephone line, the apparatus comprising:

a converter having a PSTN compatible telephone line interface for coupling to the PSTN compatible telephone terminal, the converter being for converting signals from the PSTN compatible telephone terminal into IP packets representing the telephone call; and a multiplexer coupled to the converter, and having a computer interface for coupling to the first computer, and a subscriber line interface for coupling to the subscriber telephone line, the multiplexer being arranged for sending simultaneously the IP packets representing the telephone call and those from the computer, along the subscriber telephone line;

the apparatus being arranged to handle telephone calls without conversion to IP packets, between the telephone terminal and the subscriber telephone line when the subscriber telephone line is not used for carrying IP packets.

One of the problems of the prior art, discovered and addressed by this aspect of the invention is the ability to provide, using one subscriber line, e.g. a conventional POTS (Plain Old Telephone Service) line, that all phones in a household remain operational (i.e., they can be used to make and receive calls), while one or more PCs are concurrently accessing online services, without needing a second line, or special equipment to increase the bandwidth transmissible over the line by a factor of two or more.

One advantage of providing the capability of handling phone calls from the PSTN compatible telephone terminal on the subscriber line either over a telephone interface, or in the form of IP packets is that it enables a single subscriber line to be used for both purposes. This cannot be achieved with traditional telephones which can always only use the telephone interface, nor with the Internet phone jack and Phone doubler products which can always only carry calls in the form of IP packets.

Another advantage arises from the converter having a PSTN compatible interface. One consequence of this is that existing telephones, extension telephones and telephone cabling in a house or office can continue to be used even when the subscriber telephone line is carrying IP packets. This previously would have required a second line. In the above mentioned Internet phone jack and Phone Doubler products, telephony is limited to a headset and microphone belonging to the computer, or to a telephone terminal belonging to the computer.

With respect to the above mentioned known ISDN or ADSL systems, such systems have no converter, but require expensive dedicated linecards and other expensive equipment at the central office and the Internet service provider to provide a bandwidth of 128 Kbps or higher. The converter enables telephony and IP services to be carried simultaneously at much lower cost, over a conventional subscriber telephone line. The apparatus does not require additional equipment on the subscriber telephone line to provide a high bandwidth service. It only requires the bandwidth that a conventional subscriber telephone line supports for conventional dialed telephone calls.

Preferably the apparatus further comprises a bridge for selectively coupling the subscriber telephone line to an internal telephone line to which the telephone terminal is attached.

This can enable an advantage to be achieved in that telephone calls can be routed directly without using the converter when the computer is not using the subscriber line, and in that telephone calls can be converted into IP packets and be routed in an IP session when the computer is using the subscriber telephone line for an IP session. Further, this can also enable a second advantage in that when the internal cabling is not coupled to the subscriber telephone line, the internal cabling can be used for purposes such as telephone calls between terminals within the customer site, without interfering with signals on the subscriber telephone line.

Preferably, the telephone terminal is coupled to the apparatus via an internal telephone line, the apparatus further comprising a telephone data interface coupled to the multiplexer and arranged for coupling to the internal telephone line, for receiving data from a further computer coupled to the internal telephone line, and distinguishing this data from analog signals from the telephone terminals, the multiplexer being arranged to send the data from the further computer along the subscriber telephone line.

One advantage which can arise here is that the further computer can make use of existing internal telephone cabling in a house or office to access online services over the subscriber line. Furthermore, it may be possible to do so simultaneously with the first computer using the subscriber line, or with a telephone call taking place, or even simultaneously with both of these possibilities. The above mentioned Homerun product can be used to enable multiple computers to concurrently access online services over a conventional subscriber telephone line and existing internal cabling. However, in such an arrangement the existing telephone terminals connected to the internal cabling cannot be used to send or receive calls while a computer is online.

Preferably, the telephone terminal is coupled to the apparatus via an internal telephone line, the apparatus further comprising a telephone data interface coupled to the multiplexer and for coupling to the computer interface, for receiving data from a further computer coupled to the internal telephone line, the multiplexer being arranged to send the data from the further computer to the first computer.

This enables multiple computers to communicate amongst themselves using existing telephony cabling. This enables many of the advantages of a local area network to be achieved using existing cabling. Furthermore the combination of this local area network capability with the capability of the first computer to access online services while maintaining telephony, can make it possible for the further computer to access online services via the first computer. Alternatively, or concurrently, telephone terminals can make and receive calls.

Preferably the telephone line interface and the telephone data interface are arranged to communicate over the internal telephone line simultaneously.

The combination of this local area network capability with the capability of the apparatus to access online services while maintaining telephony, can make it possible for any or many computers to access online services via the apparatus while concurrently allowing telephone terminals anywhere on the internal telephone line to make and receive calls. In the above mentioned Homerun product, a computer can communicate with a further computer while a call is being made from a conventional telephone terminal. However, in such an arrangement, the computers may not access online services at the same time as the call is being made from the conventional telephone terminal.

Preferably the telephone line interface further comprises an internal line monitor for determining the state of telephony activity from the telephone terminal, the apparatus being arranged to control a telephone call in response to the determination.

An advantage of this is that it enables the call to be controlled as desired by the end user.

Preferably the apparatus further comprises a subscriber line monitor for determining the state of the subscriber telephone line the apparatus being arranged to control a telephone call in response to the determination.

This can help in deciding if the call can be established in conventional non-IP form.

Preferably the apparatus further comprises an IP session monitor for determining when there is an IP session already existing, the apparatus being arranged to control a telephone call in response to this determination.

This can help decide whether the call can be established using an existing IP session.

Preferably the apparatus further comprises an internal line monitor for determining the state of telephony activity from the telephone terminal, and a subscriber line monitor for determining the state of the subscriber telephone line, the apparatus being arranged to control the call additionally on the basis of the outputs of the internal line monitor and the subscriber line monitor.

In combination the capability to monitor telephony activity from the telephone terminal and the capability to monitor the state of the subscriber telephone line, provide an advantage for example in enabling voice over IP resources to be used to establish a call when the subscriber telephone line is being used already to access an online service, or according to other criteria, e.g. if it is more cost effective. A second advantage would be to facilitate a decision to establish the call as a conventional analog telephony call for example when an IP session is not established and the subscriber telephone line is idle.

Preferably the telephone line interface is arranged to determine what number has been dialed, and establish the call as a VoIP call, or establish the call as a conventional telephone call, on the basis of the number dialed.

An advantage is that the decision of whether to route the call using VoIP or non VoIP can be made automatically for example when it is more cost effective, or when instructed by the subscriber.

Preferably the apparatus further comprises an internal line monitor, for determining the state of telephony activity from the telephone terminal, the apparatus being arranged to send a busy indication in response to an incoming call for the telephone terminal, if an IP session is established and if the internal line monitor determines that the telephone terminal is busy.

Preferably the apparatus is arranged to prompt a caller of an incoming call to indicate a party that he intends to reach, and the telephone interface is arranged to process the call on the basis of the party indicated by the caller.

Preferably the telephone line interface is arranged to output an alert specific to the party indicated by the caller.

Preferably the multiplexer further comprises a second subscriber line interface for coupling to a second subscriber line.

This can enhance the apparatus by allowing for example a non VoIP call on one line at the same time as one or more IP sessions are being handled over the other line.

Preferably the multiplexer further comprises a second subscriber line interface for handling a second connection over the subscriber telephone line, for use with a high bandwidth coupler for multiplexing the second connection over the subscriber telephone line.

This can enhance the apparatus by allowing for example a non VoIP call on the subscriber line at the same time as one or more IP sessions are being handled in the second connection over the subscriber telephone line.

According to a further aspect of the invention, there is provided apparatus for use with a subscriber telephone line connecting a subscriber site and a telephone network, for simultaneously sending a telephone call from a PSTN compatible telephone terminal on the subscriber site coupled to an internal telephone line, and data from a computer coupled to the internal telephone line, over the subscriber telephone line, the apparatus comprising:

a converter having a PSTN compatible telephone line interface for coupling to the PSTN compatible telephone terminal, the converter being for converting signals from the PSTN compatible telephone terminal into IP packets representing the telephone call;

a telephone data interface for coupling to the internal telephone line for receiving the data from the computer over the internal telephone line, the telephone line interface and the telephone data interface being arranged to communicate over the internal telephone line simultaneously; and a multiplexer coupled to the converter, and coupled to the telephone data interface, and having a subscriber line interface for coupling to the subscriber telephone line, the multiplexer being arranged for sending simultaneously the telephone call and the data from the computer, along the subscriber telephone line in the form of IP packets.

The above mentioned problem of the prior art, is also addressed by this aspect of the invention. All phones in a household remain operational (i.e., they can be used to make and receive calls), while one or more PCs are concurrently accessing online services, without needing a second line, or special equipment to increase the bandwidth transmissible over the line by a factor of two or more. Compared to the first aspect, at least one of the PCs makes use of the internal telephone line to reach the subscriber line, but the direct computer connection with the apparatus avoiding using the internal telephone line, is optional.

Preferably the apparatus further comprises a bridge for selectively coupling the subscriber telephone line to the internal telephone line.

Preferably the telephone data interface comprises a local area network interface for coupling more than one computer to the apparatus.

According to a further aspect of the invention, there is provided apparatus for use with a subscriber telephone line connecting a subscriber site and a telephone network, for simultaneously receiving a telephone call to a PSTN compatible telephone terminal on the subscriber site, and IP packets directed to a first computer, both sent over the subscriber telephone line, the apparatus comprising:

a converter having a PSTN compatible telephone line interface for coupling to the PSTN compatible telephone terminal, the converter being for converting from IP packets representing the telephone call into signals for the PSTN compatible telephone terminal; and a demultiplexer coupled to the converter, and having a computer interface for coupling to the first computer, and a subscriber line interface for coupling to the subscriber telephone line, the demultiplexer being arranged for receiving simultaneously the IP packets representing the telephone call and those for the computer, over the subscriber telephone line;

the apparatus being arranged to handle telephone calls without conversion to IP packets, between the telephone terminal and the subscriber telephone line when the subscriber telephone line is not used for carrying IP packets.

According to a further aspect of the invention, there is provided apparatus for use with a subscriber telephone line connecting a subscriber site and a telephone network, for simultaneously receiving over the subscriber telephone line from the subscriber site a telephone call from a PSTN compatible telephone terminal coupled to an internal telephone line and data for a computer coupled to the internal telephone line, the apparatus comprising:

a converter having a PSTN compatible telephone line interface for coupling to the PSTN compatible telephone terminal, the converter being for converting IP packets representing the telephone call into signals for the PSTN compatible telephone terminal; a telephone data interface for coupling to the internal telephone line for receiving the data from the computer over the internal telephone line; and a demultiplexer coupled to the converter, and to the telephone data interface, and a subscriber line interface for coupling to the subscriber telephone line, the demultiplexer being arranged for receiving simultaneously the telephone call and the data for the computer, over the subscriber telephone line in the form of IP packets.

According to a further aspect of the invention, there is provided a method of simultaneously sending a telephone call from a PSTN compatible telephone terminal on a subscriber site and IP packets from a first computer, over a subscriber telephone line, the method comprising the steps of:

converting signals from the PSTN compatible telephone terminal into IP packets representing the telephone call;

using a multiplexer coupled to the converter, and having a computer interface for coupling to the first computer, and a subscriber line interface for coupling to the subscriber telephone line, to send simultaneously the IP packets representing the telephone call and those from the computer, along the subscriber telephone line; and handling telephone calls without conversion to IP packets, between the telephone terminal and the subscriber telephone line when the subscriber telephone line is not used for carrying IP packets.

According to a further aspect of the invention, there is provided a method of simultaneously sending a telephone call from a PSTN compatible telephone terminal on a subscriber site coupled to an internal telephone line, and data from a computer coupled to the internal telephone line, over a subscriber telephone line, the method comprising the steps of:

converting signals from the PSTN compatible telephone terminal into IP packets representing the telephone call;

using a telephone data interface coupled to the internal telephone line for receiving the data from the computer over the internal telephone line; and using a multiplexer coupled to the converter, and to the telephone data interface, and having a subscriber line interface for coupling to the subscriber telephone line, to send simultaneously the telephone call and the data from the computer, along the subscriber telephone line in the form of IP packets.

Another aspect of the invention provides software stored on a computer readable medium for carrying out the above methods.

Any of the preferred features may be combined, and combined with any aspect of the invention, as would be apparent to a person skilled in the art. Other advantages will be apparent to a person skilled in the art, particularly in relation to prior art other than that mentioned above.

To show, by way of example, how to put the invention into practice, embodiments will now be described in more detail, with reference to the accompanying drawings.

BRIEF DESCRIPTION OF DRAWINGS

FIG. 13 shows the HCTA hub of FIG. 8 arranged to operate with an xDSL type of subscriber line;

FIG. 14 shows a configuration overview of a standalone embodiment using the arrangement of FIG. 5.

DETAILED DESCRIPTION

Introduction

Figure 1:
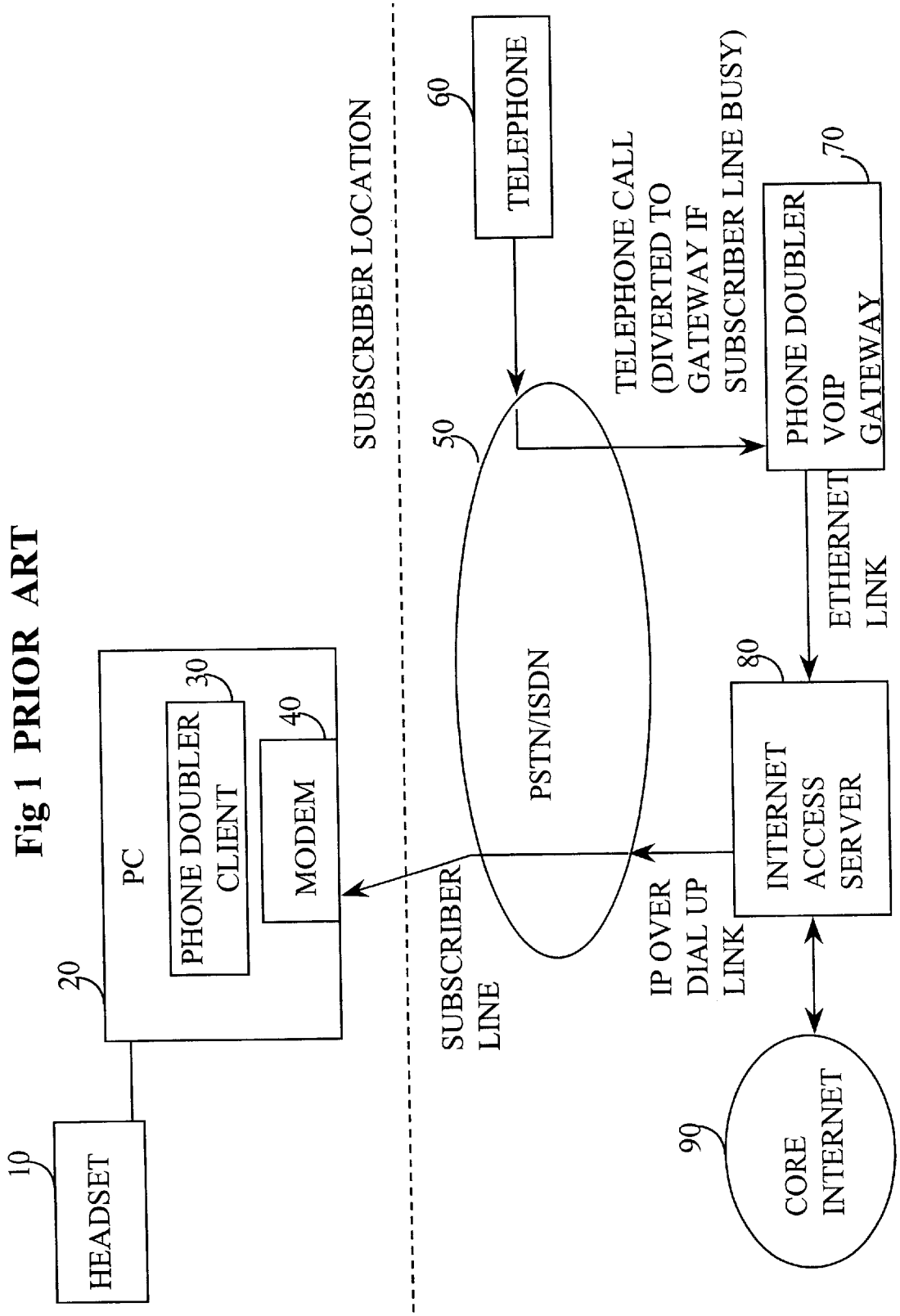
FIG. 1 shows the known Phone Doubler arrangement.

Many online households possess multiple personal computers. For instance, parents may own the new PC, and relegate to their children the older PC, or two professionals may each have their own PCs. Currently, multiple PCs in a household cannot communicate amongst themselves unless new wiring is installed. Because they cannot communicate, multiple PCs cannot share devices (e.g., modems, printers) and cannot exchange data. They also cannot use services concurrently (e.g., an Internet account).

An arrangement of hardware and software in various embodiments which addresses such problems, will be referred to as the Home Computer Telephony Adapter (HCTA). It may be implemented as a PC card using software run by the PC, or as a peripheral external to the PC. The overall purpose is to enhance communication services for online households. Most notably, it enables telephony to be maintained for the whole household while PCs are accessing online services. The HCTA also provides a data communication capability over the existing in-house wiring. This enables PCs to exchange data and to share devices and services. For instance, HCTA enables multiple PCs to be concurrently online.

The HCTA requires its end user to subscribe to one POTS line and to subscribe to an Internet service with Voice-over-IP (VoIP) and Internet Call Waiting (ICW) features, which are commercially available, and expected to become widely available. It also requires the end user to possess a PC with a modem, preferably 56 kbps. HCTA requires no second line or special Telco (Telephone Operating Company) equipment to function properly, although performance would improve with such capabilities, and some embodiments including such capabilities are discussed below.

A given HCTA implementation may differ from existing products in various ways including the following:

a) It may operate with the in-house wiring uncoupled from the PSTN access line.

b) It may monitor telephony activities on the in-house wiring and on the PSTN access line, and PC access to online services.

c) It may provide telephony for the household over the PSTN when no PC is online and provide telephony for the household through the PC when the PC is online.

These differences enable the HCTA to offer basic Key system/LAN/Bridge capabilities to the household. Specifically, some notable features which will be explained in more detail below are:

a) Regarding voice communication:
1) To enable people to make and receive calls from any phone in the household while PCs are connected to online services.
2) To enable calls within the household (intercom), and to provide distinctive ringing to all household occupants.
3) Access to cheap Internet-based toll services from any phone and concurrent calls from PCs and phones.

b) Regarding data communication:

To enable multiple PCs in the household to exchange data, to be concurrently online and to share devices (e.g., a printer, a modem). These services are provided over the existing in-house wiring. They require no re-wiring or additional wiring. To support these services, the HCTA relies on available technology for telephony over the Internet (for example VoIP) and on available technology for multiplexing of voice and data signals over internal wiring in the household for example by frequency division multiplexing.

Figure 2:
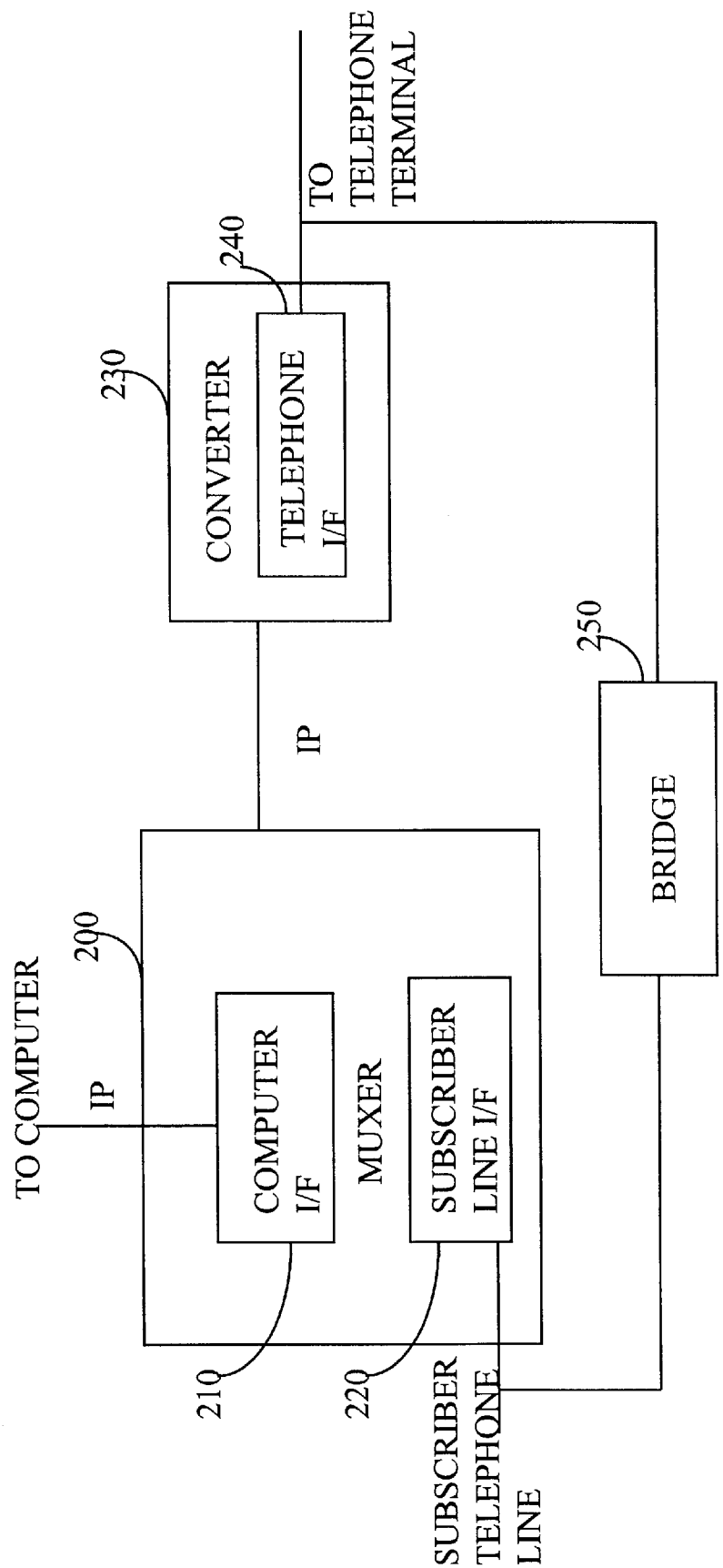
FIG. 2 shows a schematic view of apparatus of a first embodiment of the invention.

FIG. 2 schematic view of first embodiment of the invention

FIG. 2 shows in schematic form some of the features of one embodiment of the apparatus at the subscriber side, for use with the PSTN, and the Internet as shown in FIG. 1. The subscriber side apparatus includes a multiplexer 200, a computer interface 210, and a subscriber line interface 220. The multiplexer is coupled to a converter 230. The converter feeds a telephone interface 240, coupled to a conventional PSTN telephone terminal (not shown).

A bridge 250 enables the subscriber telephone line to be coupled to the PSTN telephone terminal without going through the multiplexer 200 and the converter 230. The apparatus is capable of sending a telephone call from the PSTN telephone terminal, and IP packets from the computer, over the subscriber telephone line. The converter is for converting signals from the PSTN telephone terminal into IP packets representing the telephone call. The apparatus may additionally handle telephone calls without conversion to IP packets, between the telephone terminal and the subscriber telephone line, when this subscriber telephone line is not being used for carrying IP packets.

The apparatus may be arranged for outgoing calls and data from the subscriber location, or for handling incoming calls and data in a corresponding manner, or may be arranged to handle traffic in both directions.

Since IP sessions, for transmitting IP packets, can be multiplexed simultaneously over a single subscriber line, providing the converter 230, and the telephone interface 240, enables the telephones in a household or small office to be used while a computer accesses the Internet using the computer interface and the multiplexer. However, under some circumstances, it is preferable not to convert the telephone call into IP packets, but instead to use the bridge 250. For example, it might be more cost effective, the voice quality may be better on one rather than the other, and one may be more reliable or connect more quickly than the other. One specific advantage is that it makes it easier to ensure continuous telephone service is available, even when a host PC is switched off, or when power is cut to converter or multiplex circuitry or hardware on which such functions are executed.

The functions shown in FIG. 2 need not be co-located. For example, the telephone interface and subscriber line interface could be located at the entry point where the subscriber telephone line enters the subscriberıs location or site. The bridge could conveniently be located with the subscriber line interface and the telephone interface. Some of the multiplexer functions for handling IP packets from elsewhere could conveniently be implemented in software, running on a host computer, which may or may not be the same computer which sources the data being multiplexed with the telephone calls. As will be discussed below in more detail, it is possible to have the computer connected indirectly via the internal telephone line, rather than through its own direct connection to the multiplexer.

Figure 3:
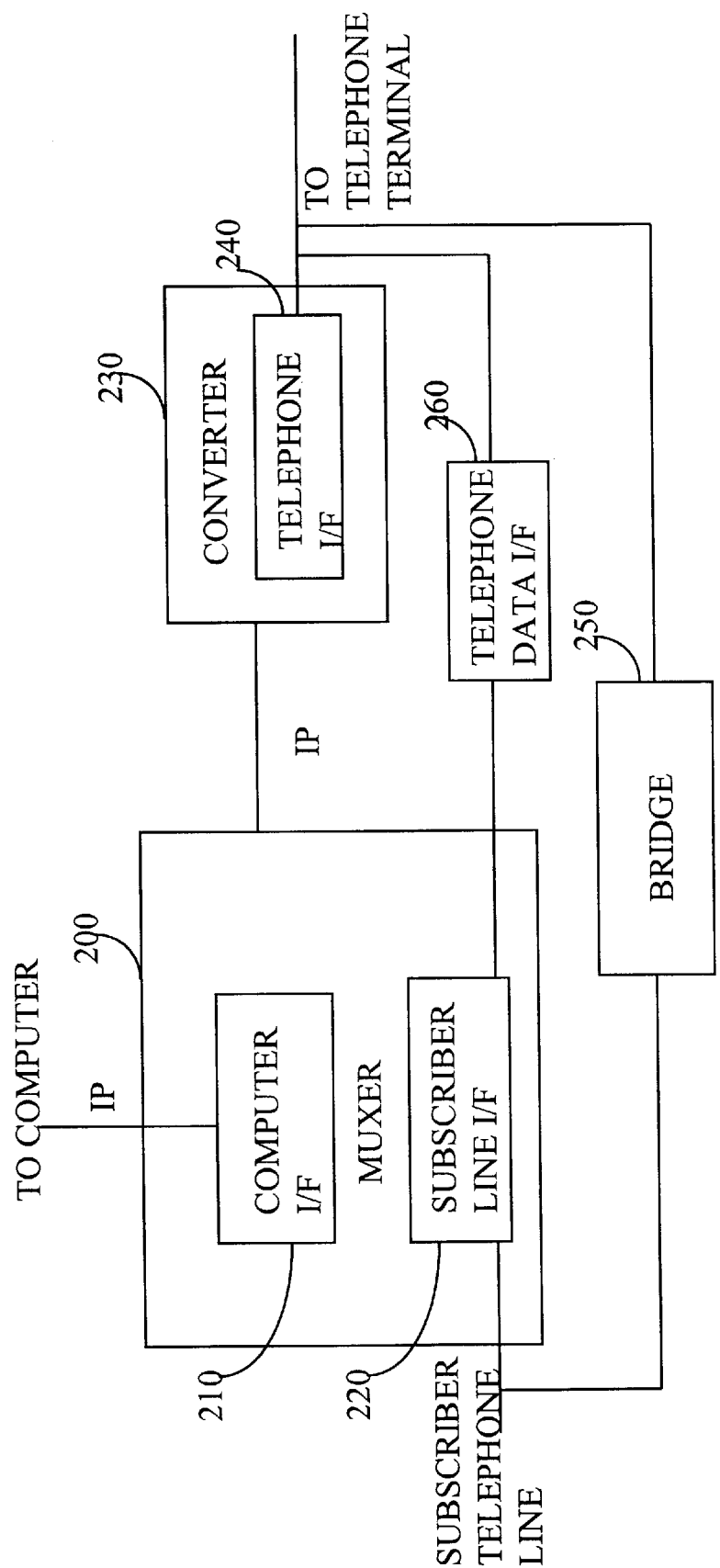
FIG. 3 shows a schematic view of an alternative embodiment of the invention.
Figure 4:
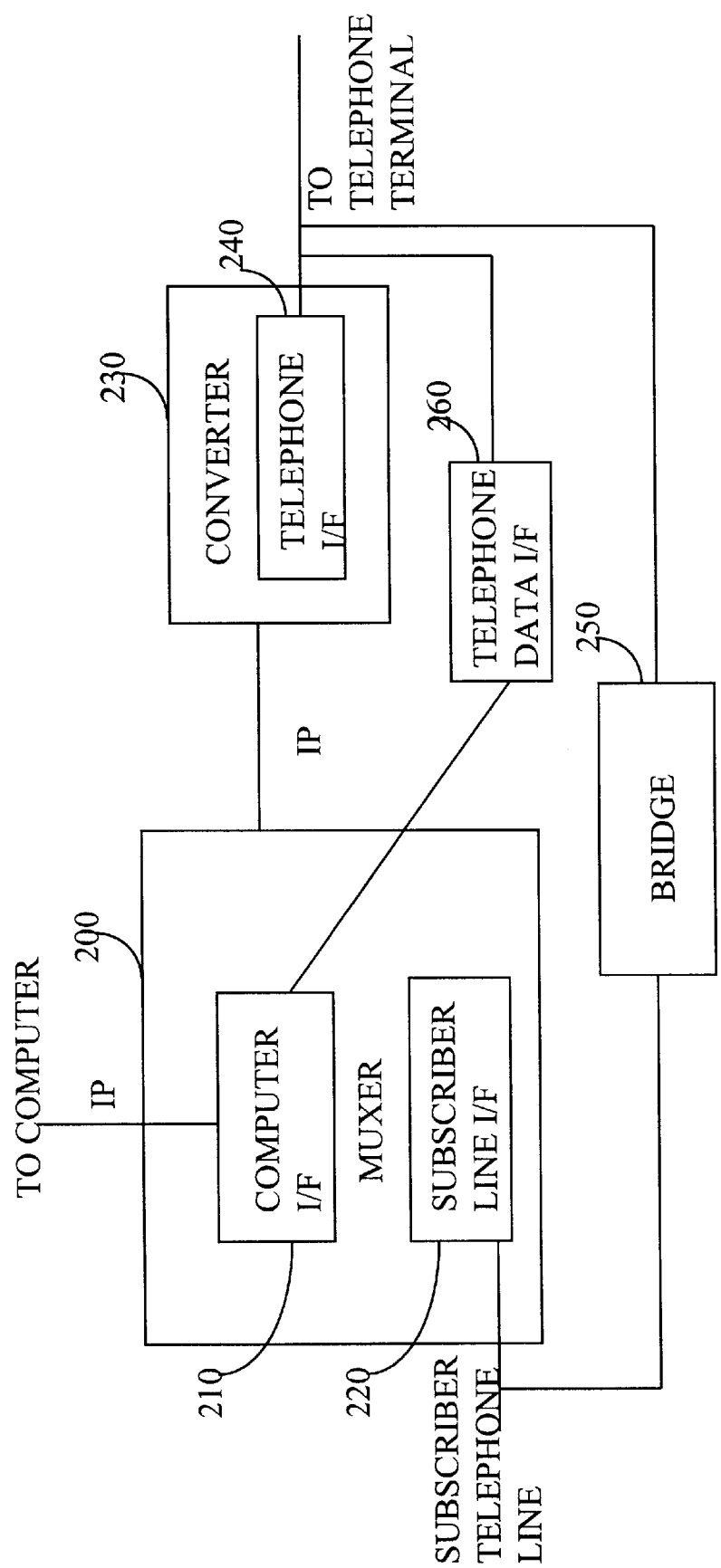
FIG. 4 shows a schematic view of apparatus according to a further embodiment of the invention.

FIGS. 3, 4 alternative embodiments

In addition to all the features shown in FIG. 2, FIG. 3 has a telephone data interface, 260, which couples the internal telephone line to the subscriber telephone line via the multiplexer 200. This enables one or more computers connected to the internal telephone line to access on-line services through the multiplexer. This enables the computer directly connected to the multiplexer to continue to access on-line services concurrently.

In FIG. 4, the telephone data interface 260 is coupled to the multiplexer, but in such a way as to enable computers connected to the internal telephone line to pass data to the computer (the first computer), which is directly coupled to the computer interface 210. The telephone data interface could be coupled to both the computer interface and the subscriber line interface (not shown). This combination of the arrangements of FIGS. 3 and 4 would allow computers on the internal line to achieve the advantages of both FIGS. 3 and 4. The telephone interface and the telephone data interface may be arranged either so that only one computer or telephone terminal may be connected at one time, or techniques such as frequency division multiplexing may be used to enable the internal line to be used concurrently by a telephone device and a computer. The internal telephone line may be used as a local area network to enable multiple computers to communicate with each other.

The computers on the internal telephone line may use IP to communicate with on-line services, in which case the multiplexer might comprise a proxy server for relaying HTTP requests and responses in the form of HTML documents for example. The proxy server could reside on the first computer, connected directly to the multiplexer.

Figure 5:
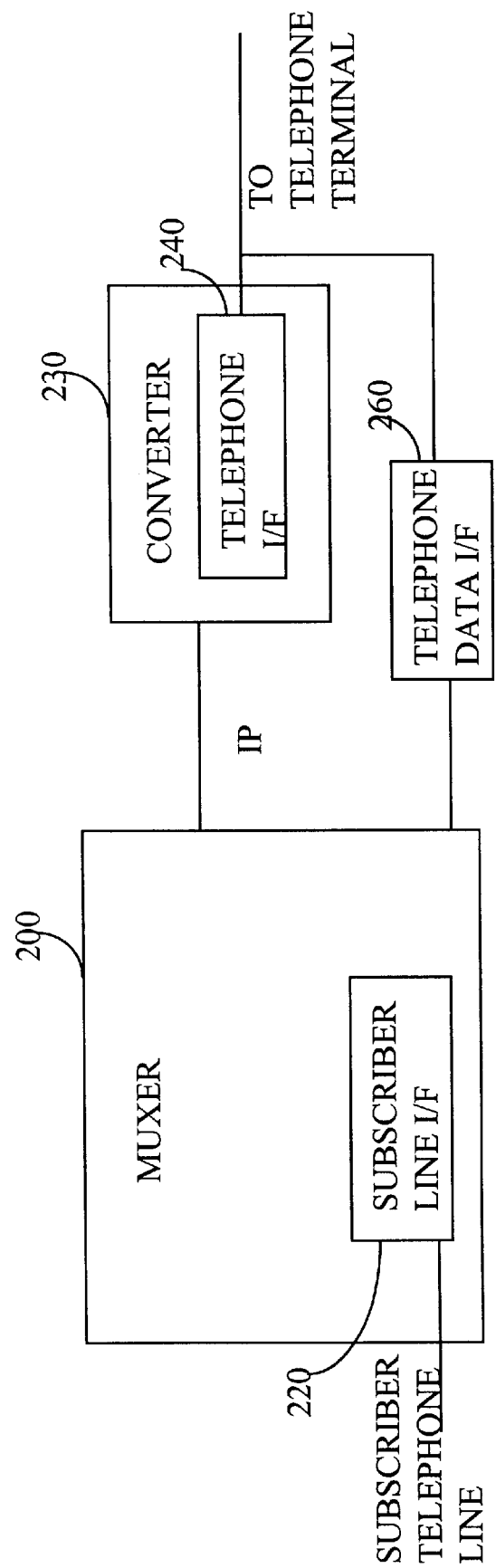
FIG. 5 shows a schematic view of apparatus according to a yet further embodiment of the invention.

FIG. 5 alternative embodiment

In this embodiment, there is no direct connection to a computer, all computers are connected over the internal telephone line. Accordingly, there is a telephone data interface 260, but no computer interface 210. The telephone line interface and telephone data interface are arranged to be able to communicate simultaneously over the internal telephone line. Thus the multiplexer 200 can be used to multiplex a telephone call from the internal telephone line received via the telephone interface 240, together with a data transmission from one of the computers connected to the internal telephone line, received over the telephone data interface 260. A bridge corresponding to that shown in FIGS. 2 to 4 is optional, but is preferred for the reasons given above. One or more computers can be connected to the internal line, and thus access on line services while allowing telephony simultaneously over the internal line. Some of the advantages of this embodiment will be discussed below with reference to FIG. 14.

Figure 6:
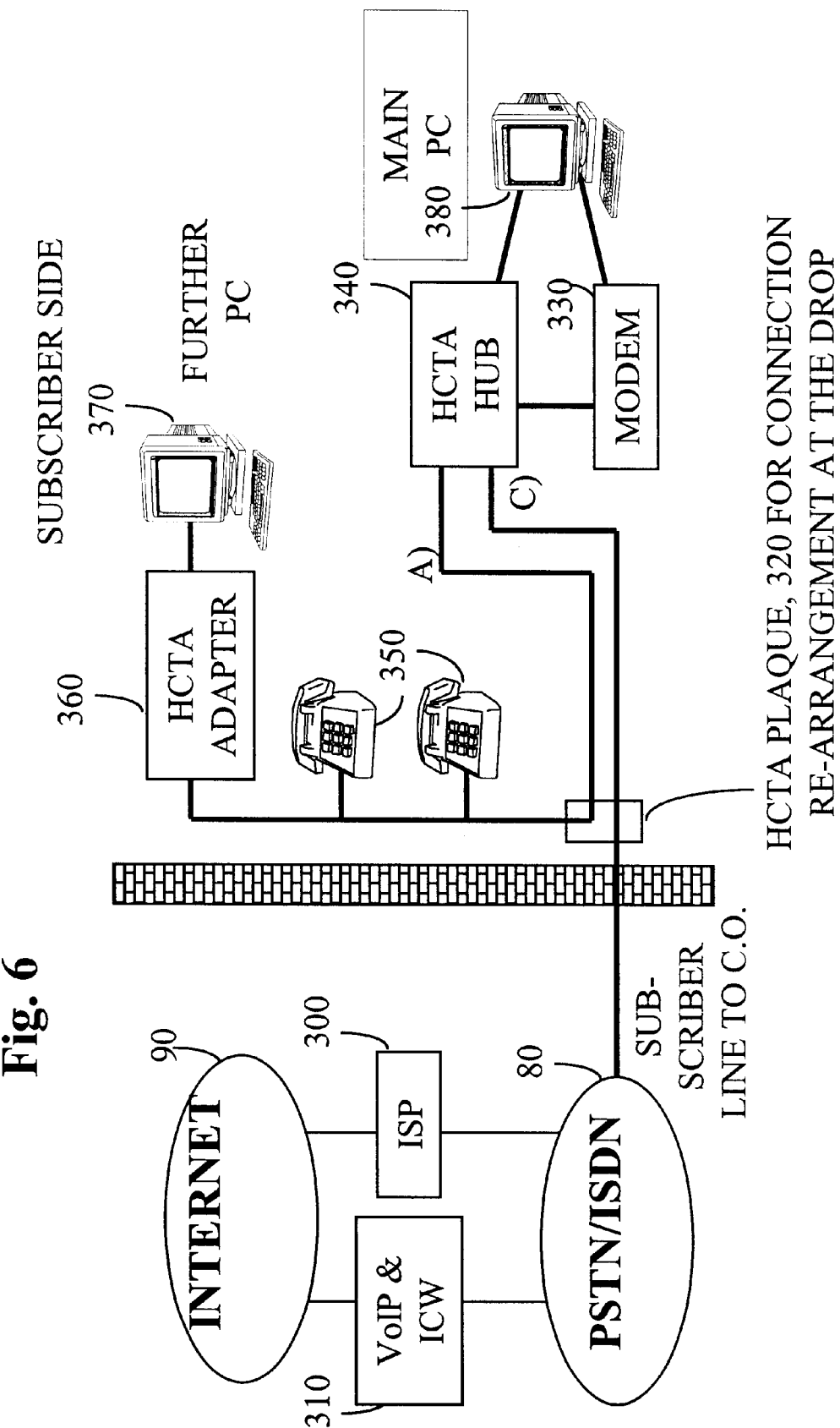
FIG. 6 shows an overview of a further embodiment which includes features corresponding to the embodiments of FIGS. 2,3 and 4.

FIG. 6, HCTA Configuration Overview

FIG. 6 presents an overview of the configuration of the HTCA.

In this embodiment, the HCTA requires the subscriber (end-user) to have the following equipment:

A Personal Computer (PC) 380 to act as the HCTA controller. This PC, hereafter called the main PC, hosts the HCTA software and the HCTA hub card 340. Here, it is assumed that the HCTA hub is implemented as a card resident on the main PC. However, other implementations are also possible, as described below. This PC must also be equipped with a modem 330. The main PC is not dedicated to HCTA. HCTA activities should only consume a small fraction of the processing capacity of the CPU of the main PC. The modem is an example of part of the functions encompassed by the subscriber line interface. The HCTA software embodies the multiplexer function and demultiplexer function mentioned above, and the monitoring function for determining if an IP session is established.

An HCTA hub card 340. This card resides in the main PC. It implements a telephony interface, a voice processing DSP for Internet telephony, data communication control and the bridging of the in-house wiring to the PSTN. The hub should conform to the applicable telephony standards (regarding power, ringing, and so on). The hub card embodies the above mentioned converter, the bridge, and the telephone interface. It also embodies the computer interface, the telephone data interface, and the monitors for monitoring the subscriber line, and the internal line.

HCTA LAN adapter 360. Each PC other than the main PC requires one such adapter to communicate with other PCs in the household and with the Internet.

An HCTA connection plaque 320. This plaque is installed inside the house, near the drop, where the PTSN line enters in the household. The purpose of this plaque is to facilitate the re-connection of the in-house wiring for HCTA.

PSTN/ISP service requirements

In addition, the HCTA requires the end-user to subscribe to the following services:

From the local Telco a POTS line provisioned with a call forward busy feature. These services can be obtained by the end user himself, or by the Internet Call Waiting service provider as part of his service offer.

From the Internet Service Provider (ISP) 300, an Internet service.

Local VoIP and ICW (Internet Call waiting) services 310. These services can be offered by the end-user ISP, by the HCTA service provider, or by a third party ISP. These services should be available on a gateway deployed in the local calling area of the subscriber. The VoIP service provides IP/PSTN connectivity for telephony for the end user. VoIP services should preferably conform to the well known H323 standard. The ICW provides notification and disposition or diverting services for incoming calls to the subscriber when his line is busy.

The above are minimal requirements. The HCTA will function properly, and will achieve superior performance if the user possesses two lines, or can access the Internet at a higher speed than 56 kbps. The HCTA hub 340 and the modem 330 reside at the host PC, 380. The HCTA hub is connected is to the PSTN/ISDN 80 by two wires (C). The HCTA is connected to all the devices hooked onto the inside wiring by two wires (A). These wires also connect together all the devices hooked onto the inside wiring. The HCTA is also connected to the modem by two wires. The wires (A) and (C) coexist in the existing 4-wire cables. This configuration requires no re-wiring and no additional wiring. However, it does require a modification of the connections at the drop. The role of the HCTA plaque, 320 located near the drop, is to facilitate the re-arrangement of the connections. If necessary, this re-arrangement at the drop can be avoided by modifying the RJ11 jacks or by inserting a small electrical connector between the RJ11 jacks and the devices hooked onto the inside wiring. More details are set out below.

The main PC is assumed to be always power-on. It is also assumed to be sufficiently powerful to host the HCTA control software. In event of power failure or of malfunction of the HCTA, the HTCA hub connects the in-house wiring (A) to the PSTN (C) and to the modem, thereby maintaining basic telephony, dial up access, and the in-house LAN. Secondary PCs 370 in the household, interface to the in-house wiring through an HTCA adapter 360. This is a small box residing behind the PC, or a card in the PC, and will be described in more detail below. Telephones 350 are plugged into the internal line without any adapter.

Figure 7:
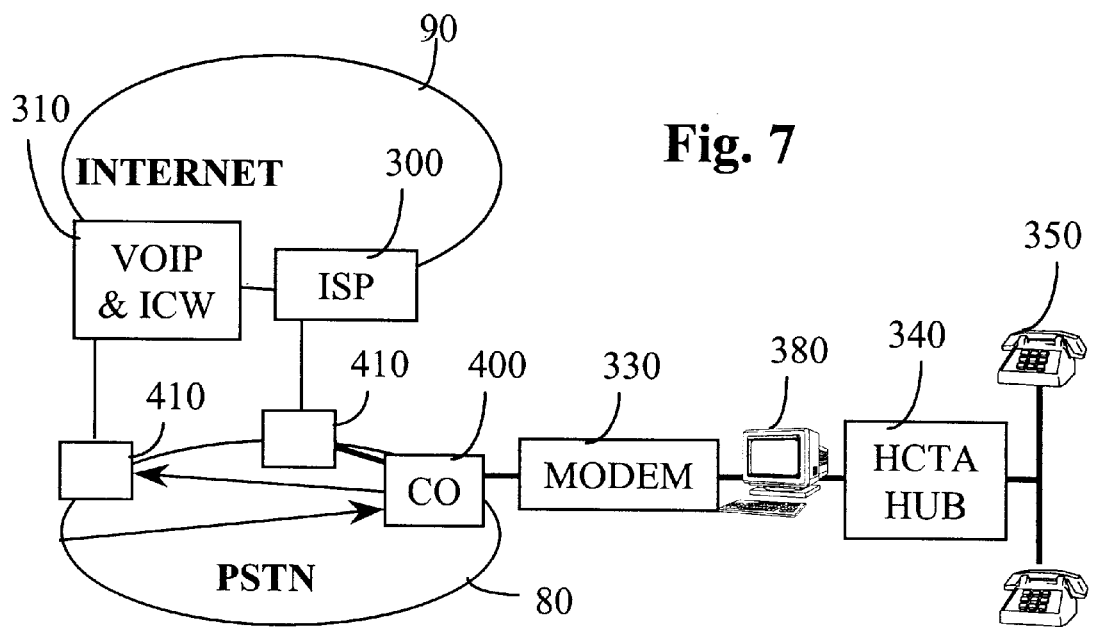
FIG. 7 shows in more detail in schematic form the operation of network services in the embodiment of FIG. 6.

FIG. 7 Network services operation for HCTA

FIG. 7 shows some features corresponding to those of FIG. 6. In addition, a Central Office (CO) 400 is shown, where the subscriber line is linked to the rest of the PSTN. Other COs, 410 are shown to indicate that the ISP, VoIP and ICW servers need not be linked directly to the same CO as the subscriber, but may be linked to the PSTN at other COs. Assume the PC is connected to the Internet, and a call is arriving from the PSTN to the household. When the PC established its Internet connection, it notified the ICW server of its presence, and communicated to it its IP address.

When the call arrives at the CO 400, it finds the subscriber line busy (as the PC is connected to the ISP). This activates the call forward busy feature provisioned on the subscriber line (as part of the ICW service). This feature causes the CO 400 to redirect the call to the ICW server, as indicated by the arrows in the PSTN region.

The ICW server receives the call. The signaling information informs it of the calling number and of the number where the call forward busy feature was triggered (the subscriber line). This allows the ICW server to identify the subscriber to which the call should be delivered.

The ICW server requests the VoIP server to establish a VoIP call with the IP address of the subscriberís PC, and relays the incoming call to the VoIP server. The call can then be carried between the VoIP server and the subscriberís PC over the IP session of this PC to the Internet. This part is similar to the operation of the above mentioned Phone Doubler product. Now suppose that the PC is connected to the Internet, and somebody in the house picks a phone to place a call. The HCTA hub card detects this event through its connection to the inside wiring (refer to FIG. 6). It provides call supervision, and collects the digits dialed by the caller. It then requests the PC to establish a connection with the VoIP server over the Internet, and provides the VoIP gateway with the PSTN number that the caller wishes to reach. The VoIP gateway establishes the call to this number over the PSTN, and bridges it to the incoming link from the subscriberís PC.

HCTA Operation Overview

Table 1 summarizes the principal actions of an embodiment of the HCTA hub to various likely events listed at the left of the table. Each column of the table gives the reactions to each event for a given state of the internal and subscriber lines. It is assumed there is only one subscriber line. The table is valid for embodiments with or without a direct computer interface. It is not necessarily valid for embodiments in which the LAN cannot be used simultaneously with telephony on the internal line.

TABLE 1

HCTA reactions to events

| Event: | State: Fully idle | Non-IP data call | Internet session | Intercom | PSTN voice | Internet & intcm | Internet & voice |
|---|---|---|---|---|---|---|---|
| Incoming PSTN voice | Bridge it | Not seen | Ring then connect voip | Alert intercom users | Not seen | Alert intercom user | Alert phone user |
| Incoming VoIP | Not seen | Not seen | Pass to pc or ring phones | Not seen | Not seen | Alert intercom user | Alert phone user |
| Outgoing voice | VoIP or bridge | Busy: no action | Start voip | Busy: no action | Busy: no action | Busy: no action | Busy: no action |
| Outgoing Internet over lan | Set up call to ISP | Busy: no action | Mux sessions | Set up call to ISP | Alert phone users | Mux sessions | Mux sessions |
| Intercom | Ring phones | Ring phones | Ring phones | Busy: no action | Busy: no action | Busy: no action | Busy: no action |
| Lan | Route Data | Route Data | Route Data | Route Data | Route Data | Route Data | Route Data |

Considering the first listed event, when an incoming PSTN call is sent to the subscriber, it is bridged to the internal line if possible, (column 1). If there is a non IP data call, or any other state which occupies either the internal or the subscriber line, the call will not be passed through but will be held or diverted. In the case of the existing state being a non-IP data call, or a PSTN voice call, the CO (Central Office) will divert the incoming call, and the HCTA hub will not see it. Otherwise, if the existing state is an intercom call (column 5), the hub can be aware of the incoming call and can try to alert the intercom user of the incoming call either by a voice announcement or tone. This may enable the subscriber to free the internal and subscriber lines to enable the incoming call to be accepted. If the existing state is one in which an Internet session is active (columns 4,7 and 8), the line is busy and the call will be diverted to the ICW server. In these states the hub will see an incoming VoIP call (processed as in row 2 of the table).

Regarding the second listed event, an incoming VoIP call, this will normally only reach the hub if an Internet session is active, unless the ISP has some special arrangement to call the subscriber when something is sent over the Internet to the IP address of the subscriber. In either case the hub can offer the call to any computer in the household which has VoIP capabilities. Alternatively, or as well, the hub can convert the call to a conventional call, and pass it to the internal line if it is free, or alert phone users by an announcement or tone.

Regarding the third row of the table, the start of an outgoing voice call, the hub will only see this event if the state is such that the internal line is not busy. If so, and if there is an Internet session occupying the subscriber line, there is a choice of converting the call to VoIP to enable it to be multiplexed with the existing Internet session, or alerting the computer user to request (or even force) that he end his Internet session, to free the subscriber line for the outgoing call to be passed out without conversion to IP. If the subscriber line is idle, the hub can choose whether to send the outgoing call as a VoIP call or a PSTN call. The choice may be governed by various factors, as discussed elsewhere in this document.

Considering the fourth row of the table, the event is an Internet access from a computer connected to the hub via the LAN. If the subscriber line is busy, and no Internet session is active, all the hub can do is try to free the line, e.g. by making an announcement to a phone user. If the subscriber line is free, the hub can set up a call to the ISP, to start the Internet session. If a session is already active, the new session can be multiplexed with the existing one.

The fifth row is the event of an intercom session starting. This is only possible if the internal line is free. If not, the new phone user may join in the existing call, without action from the hub. If the internal line is free, the hub needs to cause the internal phones to ring, when an intercom call is requested. The user may indicate a request for intercom by dialing a predetermined sequence of keys.

As shown by the sixth row of the table, the event of transmitting data over the LAN can occur regardless of the state of the lines.

As can be seen, the operation of the HCTA for voice communication depends on the state of three parameters:
  Whether the inside wiring is currently supporting a telephone conversation.
  Whether the line to the PSTN is busy or idle.
  Whether the Main PC is connected to the Internet or not.

The relevant combinations of these states are summarized in Table 2. The operation of the product in each of these states is described in following six subsections.

Table 2

States of Telephony Parameters

| State | Inside Wiring | PSTN line | Internet Access |
|---|---|---|---|
| 1 ñ Fully idle | Idle | Idle | Not Connected |
| 2 ñ Non-Internet data dial up | Idle | Busy | Not Connected |
| 3 ñ Internet | Idle | Busy | Connected |
| 4 ñ In-house telephony | Busy | Idle | Not Connected |
| 5 ñ PSTN call active | Busy | Busy | Not Connected |
| 6 ñ In-house telephony and Internet | Busy | Busy | Connected |

1: Fully Idle State

When the inside wiring (A) and the PSTN line (C) are idle, the HCTA hub is continuously monitoring them to detect the occurrence of activity. The following events may occur:

a) A call arrives from the PSTN. The HCTA hub will answer the call, identify the called party, and then applies the ringing pattern associated with the called party on the in-house wiring. If the called party answers, the HCTA bridges the inside wiring to the PSTN line. Otherwise, the HCTA may offer to the caller the chance to leave a message. Depending on the identification of the caller, the HCTA may also immediately forward him to an announcement or to voice messaging.

For example, the HCTA may greet an incoming call by `ıYou have reached the Regnier Family, to whom do you wish to speak?î If the caller says ıto Jean pleaseî, or any sentence with the key word ıjeanî, Jeanıs distinct ringing pattern would be applied to the inside wiring. If the caller says ıto the master of the houseî, the HCTA would forward the call directly to voice messaging. Speech recognition enhances the HCTA by simplifying the caller interface.

However, is not mandatory to deliver the key benefits of HCTA. If speech recognition is too expensive or complex, a simpler menu driven interface can replace it.

b) Somebody in the house picks a phone to make a call: The HCTA will provide dial tone and will monitor the incoming digits. If the dialed digits indicate a request to the intercom service, the HCTA will monitor the incoming speech to detect the calling party requested. Upon hang up, the HCTA will apply the calling partyıs distinctive ringing pattern on the inside wiring. For example, mom could take a phone, press #, say `ıSophieî and hang up. Then Sophieıs distinctive ringing would be applied on the inside wiring. When Sophie answers, the ringing would stop, mom would pick up her phone, and they would be in communication. It may not be necessary for the caller to hang up, if ringing can be applied on the in-house wiring while the caller is listening.

c) If the dialed digits indicate a toll call, and if the HCTA has been set-up to establish toll calls by default over the Internet, the HCTA will launch an Internet session. Upon reception of all the dialed digits, the HCTA software on the main PC will establish a VoIP session with a remote gateway in the vicinity of the called party number.

d) If the dialed digits indicate a local call for which no special action needs to be taken, the HCTA will redial the digits onto the PSTN line, and will bridge the inside wiring to the PSTN line.

2: Non-Internet Data Dial-up State

This state occurs when the modem has established a data communication over the PSTN with a site from which an IP session from the Internet cannot be established with the subscriber. In this context, the Intercom service remains available as in the preceding section. However outgoing calls cannot be made, at least for the basic configuration with one POTS line. The restriction does not apply if the user has multiple lines, or an ISDN line, or an xDSL service.

Also, as the line is busy, the call forward busy feature on the end-user line will deflect incoming calls to the ICW service. There, the ICW service should play an announcement or apply a busy tone. Alternatively, the ICW service could offer a voice messaging service on call busy. Note that the ICW server knows that the call cannot be delivered to the end-user because the end-user would not be registered as active.

Occurrence of non-Internet data dial up should be rare, otherwise HCTA does not deliver its value, since the subscriber line cannot be used for dual purposes in this case.

The case of non Internet dial up from the internal line has not been discussed, as it can often be avoided by providing an HCTA adaptor for the device, to enable it to use the LAN to reach the HCTA hub.

3: Internet Session State

This state occurs when nobody in the house is using a telephone, and one or several PCs are hooked onto the Internet. The modem at the main PC has established a call with the ISP, tying the line.

Note that PCs users could be making calls directly from their PCs in this state. This would not generate telephony usage on the inside wiring. The following events may occur:

a) A call is arriving from the PSTN: The call will encounter a busy when it hits the end-user line, and will be deflected to the ICW server and then to the VoIP gateway. The VoIP gateway will establish a session with the main PC in the end-user premises, will transcode the call into VoIP format, and will deliver the call to the end-user PC. For this purpose, the end-user PC needs to register its IP address with the ICW server when it becomes online. The ICW server provides this address to the VoIP server to enable the VoIP call to be established to the end-user.

The PC can refuse to take the call, for instance if its bandwidth is too scarce to handle it. Then, the call would be sent to the ICW treatment upon busy, similarly as described for state 2. Once at the PC and transformed into PSTN format, the PC answers the call, as described for state 1.

b) Somebody in the house picks a phone to make a call: The HCTA will provide dial tone and will monitor the incoming digits. If the dialed digits indicate a request to the intercom service, the HCTA will behave as described for state 1. If the dialed digits indicate a toll call, and if the HCTA has been set-up to establish toll calls by default over the Internet, the HCTA will establish a VoIP session with a remote gateway in the vicinity of the called party number, as described for state 1. If the dialed digits indicate a local call, or indicate a toll call and the HCTA has been set-up to establish toll calls over the PSTN, the HCTA will establish a VoIP session with a local VoIP gateway. The local gateway will then relay the call to the PSTN.

4: In-house Telephony State:

In this state a conversation is being held between two phones in the household. The line to the PSTN is idle. The HCTA can answer an incoming call from the PSTN, but it cannot relay it on to the in-house wiring. The incoming call can be relayed to PCs, to be answered directly from one of the PCs, or it can be directed to announcement or to voice messaging.

The HCTA can also apply tones on the inside wiring to alert the household occupants currently on the phone to drop their conversation. When they free the in-house wiring, the incoming call from the PSTN can be relayed onto it. The alert tones can be called-party dependent, similarly as for the ringing patterns.

5: PSTN Call Active State:

A call is ongoing between a phone in the household and the PSTN. No PC can connect, and no other call can be established. Incoming calls are redirected to the ICW service by the call forward busy, where their treatment is similar as described for state 2. The HCTA may be arranged to alert the phone user that another user is wanting to use the line, either for a voice call, or an Internet session for example. The phone user could be prompted to reconnect using VoIP, and the HCTA could do some or all of this reconnection automatically.

6: In-house Telephony and Internet Session State

One or more PCs are connected to the Internet, and either:

Two phones in the household are supporting an internal conversation (intercom), or;

One phone is involved in a call, and the call is relayed outside the household by the HCTA.

In this state, no outgoing call can be made from any phone. Outgoing calls can only be made from PCs, up to the 56 kbps bandwidth capacity. In this state, incoming calls would come through the VoIP gateway. These calls should be treated similarly as in state 4. Namely, they could be answered by the HCTA, and relayed to PCs, to announcement or to voice messaging. The HCTA could also apply tones on the in-house wiring to alert the household occupant currently on the phone of the incoming call. If the call currently tying the inside wiring is terminated, the incoming call could then be relayed to the in-house wiring.

In-house LAN:

In normal mode, the main PC and the HCTA are power-on. They then offer an in-house LAN service and an Internet access service. The HCTA hub implements an Ethernet 10 baseT-like hub capability. This capability is supported by the existing in-house wiring, and coexists transparently with telephony signals (e.g., ringing, signaling, speech) that may also exist on the wires. Secondary PCs need an adapter to be on the in-house LAN. This adapter filters out telephony signals, and delivers the data stream to a standard PC port. All PCs connected to the LAN should be able to view the other PCs in their ınetwork neighborhoodı. They should also be able to view devices connected to the LAN. All PCs connected to the LAN should be able to view devices connected to other PCs, and be able to use them remotely. For instance, a PC should be able to download files to a printer attached to another PC.

Internet Access: The HCTA hub and main PC implement a multiplexing capability for Internet access. When the main PC connects to the Internet and establishes an IP session, other PCs can use this session as their channel to the Internet. This service is like a Proxy service. To the ISP, the other PCs appear simply as additional browser instances. When the main PC is connected to the Internet, secondary PCs access the Internet by connecting to the main PC over the in-house LAN. If a secondary PC wishes to access the Internet when the main PC is not connected, the secondary PC should be able to remotely instruct the main PC to connect to the Internet. Once the main PC is connected, the secondary PC accesses the Internet over the in-house LAN.

If the main PC uses the modem for a data connection other than to the ISP, Internet access is not available to the whole household.

Other Features

In several scenarios, incoming calls to the household are deflected to the ICW server. This may arise as a result of the call disposition selected by the user, or because it is the only option available (e.g., the line is busy). If the ICW server provides a messaging service on busy, the HCTA should check regularly for messages. If a message is waiting, the HCTA should apply a special tone on the telephones.

The HCTA should be capable of monitoring its integrity, and should be capable of raising alarms when it causes unacceptable degradation in telephony. In such events, the HCTA should stop all its telephony functions. Until restored, it should only connect the PSTN wiring (C) to the inside wiring (A) and to the modem.

In event of loss of power, the HCTA should connect PSTN wiring (C) to the inside wiring (A) and to the modem.

The HCTA software should run under Windows 95 and Windows NT.

The HCTA Hub

Figure 8:
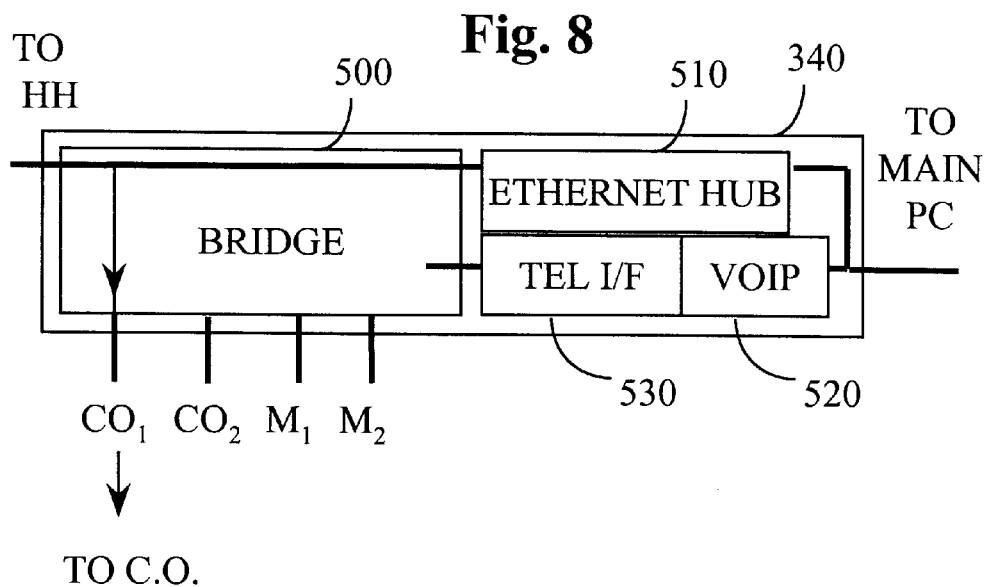
FIG. 8 shows in more detail in schematic form the HCTA hub of FIG. 6 or FIG. 7.

FIG. 8 presents an overview of the main components of the HCTA when implemented as a PC card. In this FIGURE, the ports are defined as follows:

HH: Household wiring.

CO1: Line to the central office.

CO2: Second line to the central office.

M1: Data connection to modem.

M2: Supplementary data connection to modem.

The elements of the HCTA depicted in FIG. 8 can be characterized as follows:

Bridge 500: under the control of the HCTA software, the bridge establishes connections between the 2-wire ports: HH, CO1, CO2, M1 M2 and Tel I/F. It may be implemented as a mechanical or solid state relay which will directly connect the internal line to the subscriber line when the host PC is switched off, or is in a fault state. Alternatively, the bridge could provide an indirect connection, for example through analog to digital converters and filtering software, or an opto electrical link to enable electrical isolation of the internal wiring.

Ethernet Hub 510: implements a 10baseT-like Ethernet hub capability over existing in-house wiring. This Ethernet hub requires 2 wires to operate and coexists transparently with telephony signals on these wires. Given these constraints, the bandwidth may be lower than that of a true 10baseT Ethernet LAN. The Ethernet hub is always connected to the in-house wiring. This Ethernet hub is similar to the HomeRun HR1300HEC product by Tut Systems, and the reader is referred to descriptions of this product for more details. This product offers a 1.3 Mbps 10-baseT-like LAN, and meets all the above constraints.

Telephony Interface 530 (Tel I/F): provides full PSTN emulation via an analog telephone interface (dial tone, DTMF detection, call progress tones, ring voltage etc.). When connected to the in-house wiring by the bridge, the Tel I/F can drive all the phones in the house. The telephony interface also communicates with the HCTA software on the main PC to report events that it detects (e.g., off hook), or to implement instructions (e.g., dial a given number). The capabilities of the Tel I/F are well exemplified by the Internet Phone Jack product, and the reader is referred to their product description for more details.

VoIP 520: the VoIP module may be implemented using a DSP for the transcoding of speech between PSTN and IP formats. This DSP is based on H323 codecs, and consists mainly of speech compression and echo cancellation. The H323 stack itself does not reside on the VoIP module, but resides on the main PC. The capabilities of the VoIP module are similar to the above mentioned Internet Phone Jack product, and the reader is referred to descriptions of this product for more details.

Figure 9:
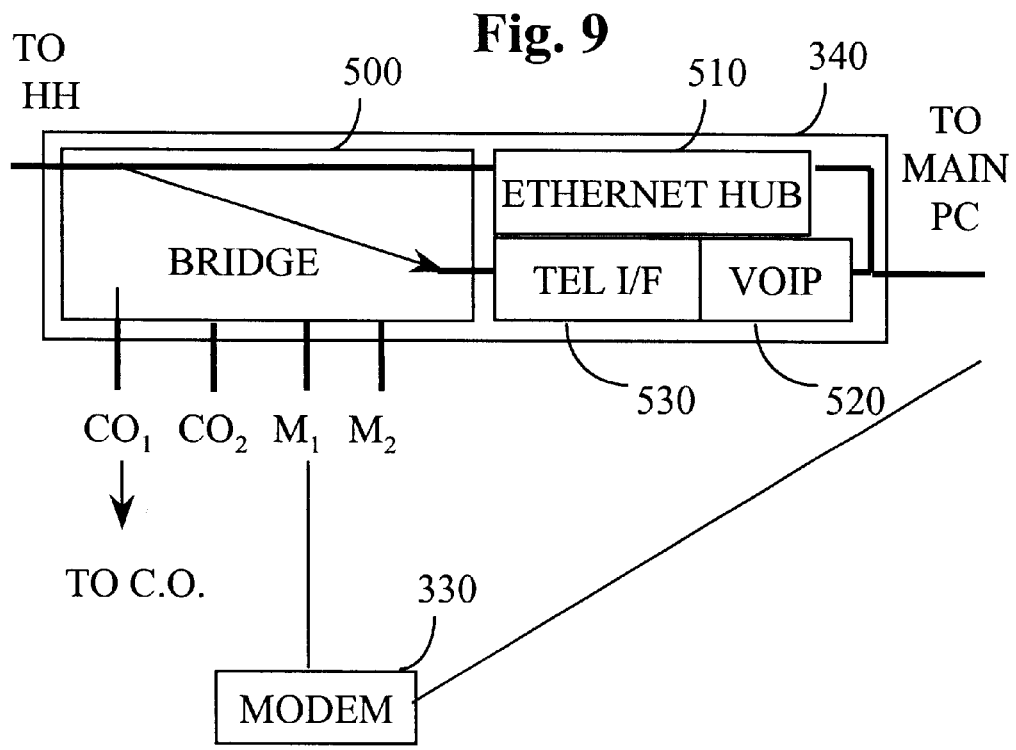
FIGS. 9 to 11 show the HCTA hub of FIG. 8, in various operational modes.

FIG. 9, Hub operation with one line in ıMonitoringı mode.

In its basic configuration, the HCTA hub requires one POTS line to be connected to port CO1 and the inside wiring to be connected to port HH. All connections are 2-wires connections. It also requires a modem to be connected to port M1. Obviously, this modem is also connected to the main PC. Ports CO2 and M2 are not used in this configuration. The HCTA hub configuration for operation with 1 POTS line is presented in FIG. 9. This Figure depicts the HCTA in monitoring mode, when the household is fully idle (i.e., no call is under way and no PC is accessing the Internet). In this mode the bridge connects the HH to the Tel I/F. The bridge also monitors itself the port CO1. Alternatively, the monitoring of CO1 can be done by connecting the modem to it, and by using the modem to detect the occurrence of activity, and to inform the HCTA control software in the main PC of this activity.

If somebody in the house picks a phone to make a call, the Tel I/F will detect this event. Depending on the dialed code and on the set-up of the HCTA operation, the following events may occur:

a) Intercom service invoked: for instance the user actions are: press # (to invoke the intercom service), speak `iSophiei and hang up. The Tel I/F would recognize the # code and relay it to the HCTA software, informing it of the request for the intercom service. The Tel I/F would next relay the speech iSophiei to the HCTA software for recognition. Upon recognition, the HCTA software would instruct the Tel I/F to apply Sophieis distinctive ringing pattern on HH. When Sophie answers from some phone in the house, the caller would pick-up his phone and the communication would be established. It may not be necessary for the caller to hang up, if ringing can be applied while he listens.

b) Local call requested; for instance the user dials a local number. The Tel I/F will detect the incoming digits and will relay the digits to the HCTA control software. The HCTA will then instruct the bridge to connect HH to CO1. Depending on the speed at which the local call can be identified and the bridge reconfigured, the Tel I/F may have to regenerate the dialed number to the PSTN.

c) Toll call requested: for instance the user dials 1-xxx-xxxx. If the HCTA is configured to handle toll calls over the PSTN by default, the operations are as in the `iLocal call requestedi event.

If the HCTA is configured to handle toll calls over the Internet by default, the Tel I/F will collect all digits and pass them to the HCTA control software. As soon as it learns that a toll call has been requested, the HCTA control software will instruct the bridge to connect CO1 and M1, and will instruct the modem to call the ISP. This will allow the ISP connection to be established while the user is completing his dialing, reducing his waiting time. When the dialed number is fully dialed and the ISP connection is established, the HCTA will establish a H323 session with a VoIP gateway in the vicinity of the dialed number, and will relay the dialed number to this VoIP gateway. The call will then be established over the Internet to the VoIP gateway, and over the PSTN from the VoIP gateway to the called number.

d) Incoming call arriving: the ringing signal on the port CO1 will be detected by the bridge, and reported to the HCTA control software. In return, the HCTA control software will instruct the bridge to connect CO1 to Tel I/F. The incoming call will then be answered by the HCTA to identify the called party. Upon identification, the bridge will connect HH to Tel I/F and Tel I/F will apply the called party distinctive ringing on HH. When the called party answers, the bridge will connect HH to CO1. This may require two 2-wire connections in Tel I/F to allow the incoming call to hear the ringing.

Figure 10:
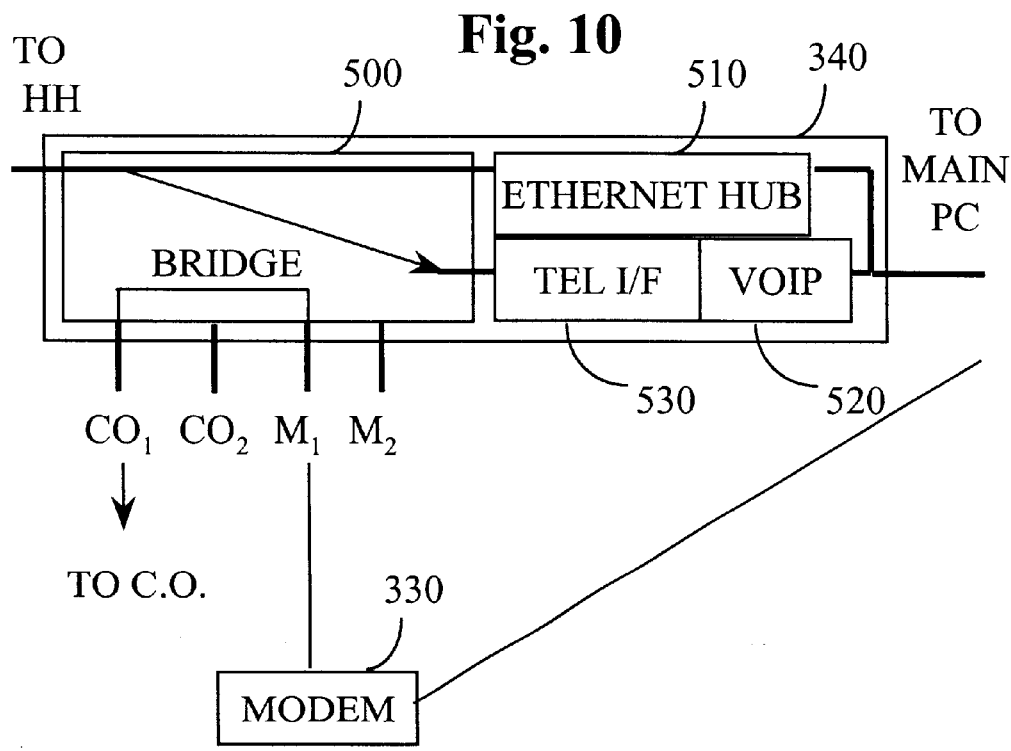

FIG. 10 HCTA Hub operating with one line in iISP connection activei mode.

FIG. 10 depicts the configuration of the HCTA hub when an Internet session is active. The bridge has established a path between CO1 and M1, and this path supports a call to the ISP. Depending on the dialed code and on the set-up of the HCTA operation, the following events may occur:

a) Intercom service invoked: the operations of the HCTA hub are similar to that in the imonitoringi mode. Additionally, it could also notify the PCs of the call.

b) Outgoing call requested; for instance, somebody in the house picks a phone to make a call. The operation of the HCTA hub is similar to that for itoll call requestedi in monitoring mode, except that and ISP connection does not have to be established. Depending on the toll/local nature of the call and of the HCTA defaults, the call would be made to a local or a foreign VoIP gateway.

c) Incoming call arriving: as the line is busy, tied up by the ISP connection, the call must be arriving as a VoIP call over the ISP connection. The call is converted into the PSTN format by the VoIP module on the HCTA hub, and then answered by the PC, in a similar manner as described above for iincoming call arrivingi in monitoring mode.

Figure 11:
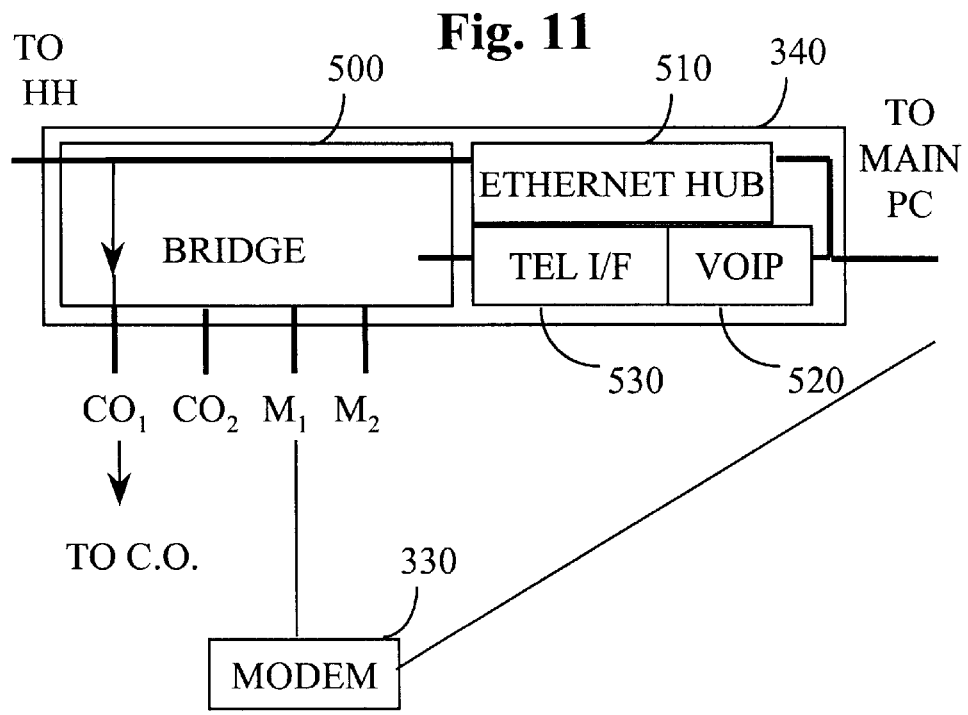

FIG. 11 HCTA Hub operating with one line in `iPSTN telephony activei mode

FIG. 11 depicts the configuration of the HCTA hub when a call is active between one of the household phones and the PSTN. A path is established between HH and CO1. In this configuration, it is not possible for PCs to access online services. PCs can only communicate locally over the LAN. As somebody in the house is already on the phone, the intercom service is also unavailable.

To allow PCs to access online services, the ongoing call needs to be terminated. Then, the main PC can establish an Internet connection. If necessary, the call that was terminated can then be re-established over the Internet, as the HCTA would now be in iISP Connection activei mode (see FIG. 10).

Figure 12:
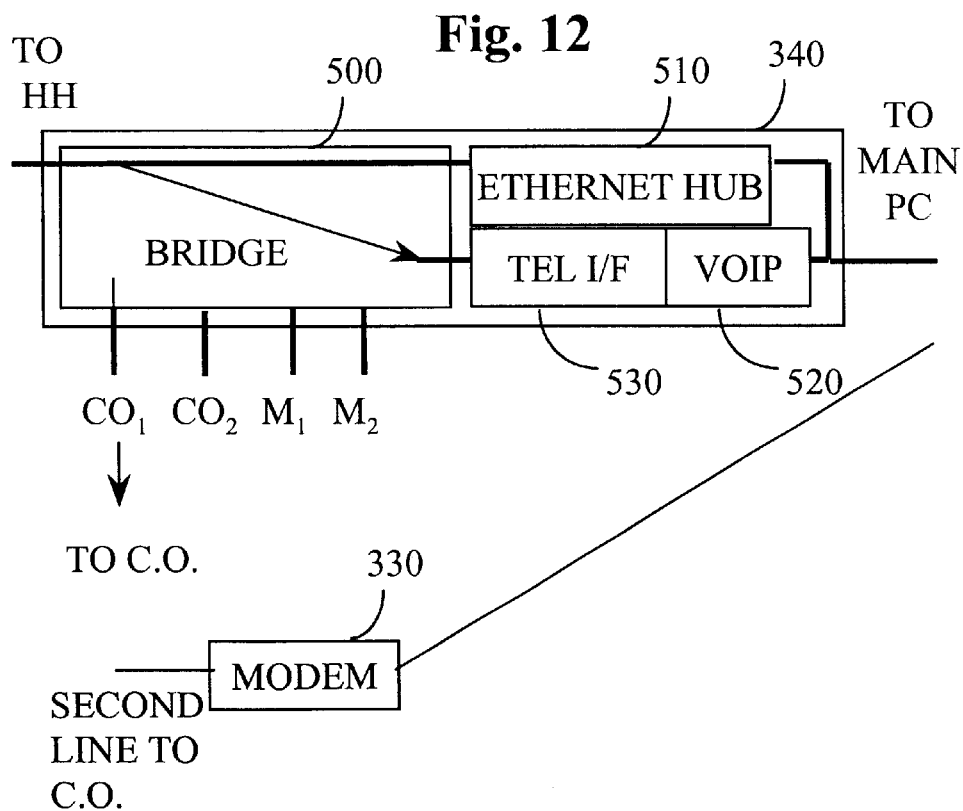
FIG. 12 shows the HCTA hub of FIG. 8 arranged to operate with two subscriber lines.

FIG. 12 HCTA Hub operating with two lines in `iMonitoringi mode.

FIG. 12 depicts the HCTA hub in the configuration where the household is equipped with 2 lines. It is assumed that one of the lines is serving the modem attached to the main PC. When one or more PCs are online, incoming calls need not be delivered over VoIP. They can be delivered directly from the PSTN by connecting CO1 to HH. This avoids VoIP usage (and, potentially, charges) for local calls.

When one of the phones in the household is active in a call to the PSTN:

a) The call does not have to be dropped to allow PCs to access online services. The ISP access is set up through the second line hooked to the modem.

b) An incoming call (from CO1) can be deflected to CO2. If CO2 is idle, the main PC can handle it (e.g., to take a message, to present it to all PCs in the household, or to apply a tone on the inside wiring to alert the household of the incoming call). If CO2 is connected to the ISP, the call can also be delivered to the main PC through the VoIP service, and the main PC can handle it similarly.

FIG. 13 HCTA Hub operating with a xDSL modem in iMonitoringi mode.

FIG. 13 depicts the HCTA hub in the configuration where the household is equipped with a high-speed xDSL modem 540. It is assumed that the xDSL modem provides two distinct communication services: a conventional telephony service (such as POTS), and a high-speed data service. In this configuration, the xDSL high-speed data port connects directly into the main PC (for instance through an Ethernet card). The xDSL voice port connects to CO1. The differences in the operation of the HCTA hub with an xDSL modem to that of the basic one-line configuration are similar to those with the configuration with two lines. When one or more PC are online, incoming calls need not be delivered over VoIP. They can be delivered directly from the PSTN by connecting CO1 to HH.

When one of the phones in the household is active in a call to the PSTN, the call does not have to be dropped to allow PCs to access online services. Furthermore, an incoming call can be redirected to the main PC, if online, to handle it (e.g., to take a message or to present it to all PCs in the household). In addition, due to the high bandwidth available with xDSL and over the LAN, this configuration enables many calls to be made concurrently. However, all but one of these calls must be made from PCs. Another possible arrangement is with two lines and an inverse multiplexer, (to enable a single data stream to be split over the two lines) or with an ISDN line.

HCTA adapter

The HCTA adapter is a 10BaseT-like Internet Network Interface Card. The HomeRun HR1300ISA adapter card produced by Tut Systems is an example which can be used. It enables LAN signals to be frequency division multiplexed over the internal telephone line at frequencies high enough that they will not interfere with telephony signals.

HCTA software functions

The main PC hosts the HCTA software responsible for the following functions:

a) Driver for the DSP card: this software module controls the installation and configuration of the HCTA hub card. It should also be able to control the upgrade of the HCTA hub card, for instance, to download new DSP software loads as standards evolve and codecs are improved.

b) Protocol host for H323 and TCP/IP: this software module provides H323 protocol services for VoIP connection set-up and management. Similarly, it provides TCP/IP protocol services for IP session set-up and management. These protocol services are expected to reuse largely existing software (e.g., Microsoft Netmeeting).

c) Multiplexing of IP sessions: this software module provides the capability to multiplex several IP sessions over a common ISP connection. These IP sessions can be made locally from the main PC, or can be made remotely over the in-house LAN from secondary PCs. This service is similar to that provided by the Internet Lanbridge product mentioned above. This software also implements a bandwidth protection mechanism for VoIP sessions.

d) Execution of telephony service logic: this software module is responsible for the control of the telephony operations of the HCTA hub card. Upon notification of events from the card (e.g., incoming call from PSTN, digits dialed in the in-house wiring, etc), it executes the HCTA telephony service logic (for intercom, Internet toll calls, etc.).

e) Control of the PC card bridge configuration: as dictated by the HCTA service logic, this software module provides the HCTA card with the appropriate telephony and bridge configuration controls.

f) Auxiliary services: these regroup the services that are not at the core of the operation of the HCTA, but that are used to support its core services. For instance, speech recognition is an auxiliary service that is used to support the core incoming call, intercom and outgoing calling services.

g) Installation and service management shields: this software module is responsible to support the end-user in installing and managing the HCTA.

h) The software on the main PC may also include a PC-based telephony interface, for instance for screen-based notification of incoming calls.

Software on other PCs

Further or secondary PCs connected to the LAN using an adapter described above, have HCTA LAN software enabling the end-user to install and manage their LAN connection to the Ethernet hub on the main PC. The software on the secondary PCs may also include a PC-based telephony interface, for instance for screen-based notification of incoming calls.

The HCTA Plaque for reconnecting the internal line to the subscriber line

The HCTA plaque is a small piece of hardware screwed or nailed in the wall inside the house near the telephone drop. Its role is to facilitate the re-arrangement of the connections for HCTA. It may not be necessary if as in older houses, the point where the subscriber line meets the various branches of the internal line, is accessible in one of the rooms of the house. In this case, the PC which hosts the HCTA adapter can be connected directly in between the internal line and the subscriber line, without needing to use the four wires of one of the branches of the internal wiring to enable this PC to be inserted between the internal line and the subscriber line. The plaque may not be needed for embodiments in which the HCTA hub is implemented as a stand alone peripheral, which can be located away from its host PC, or for embodiments corresponding to FIG. 5, in which all PCs are connected over the internal line. The plaque has three ports, one for the subscriber line (CO port), one for the internal line (Inside wiring port), and one (PC port) for the branch of the internal wiring, ìhost PC wiringî, leading to the PC hosting the hub. Within the plaque, two of the wires from the PC port are connected to the CO port. The other two wires from the PC port are connected to the Inside wiring port. To install the plaque, the inside wiring needs to be disconnected from the subscriber line, and the host PC wiring needs to be separated from the other branches of the internal line.

FIG. 14, Configuration overview of standalone embodiment

The implementation of the HCTA described above with a host PC which has a direct computer interface to access the subscriber line without using the internal line has some advantages. It can minimize the cost of the product and it reuses devices that the subscriber may already possess, such as a modem. However, an alternative implementation of HCTA involves a hub in the form of a standalone box based on the arrangement shown in FIG. 5 with no PC having a direct interface. All PCs would be connected over the internal telephone wiring. One or more of the PCs could still retain the host function of being able to configure the standalone box remotely. The standalone box could be located near the drop, provided a source of power is available. Such an implementation would differ from that presented in this document in the following ways:

a) The HCTA hub would integrate all the run-time capabilities of HCTA. It would also integrate an on-board modem, or an interface to a separate local modem.

b) Configuration of the HCTA hub would be done from the main PC, but the main PC would not be involved in its operation. This would free the main PC from the requirement of being always on.

c) The HCTA hub would require a CPU, memory and an I/O port for autonomous operation. This will add to its cost. On the other hand, the HCTA hub may not require a DSP chip, as the VoIP processing could be done by the on-board CPU chip.

d) Installation would be simple. It would consist in screwing the HCTA to the wall near the drop, and in connecting the CO line to one port, and the in-house wiring to another. However, it would require availability of a source of power near the drop.

e) The main PC would need to be equipped with a network interface card for communication over the in-house LAN.

f) It would be easier to install HCTA for 2-line operation or enable a later upgrade for such operation, assuming both subscriber lines are available at the drop. This is because there is now no need for one or more separate branches of the internal wiring for the host PC Such branches may otherwise require some rewiring, to separate them from the rest of the internal wiring.

This alternative implementation has simpler installation requirements. It requires the user to screw the HCTA to the wall near the drop, and to plug it to a source of power. It is more expensive in terms of the HCTA product itself, but it may save the visit of a professional installer, hence may be cheaper overall to the end subscriber. To implement the hub in standalone form, hardware corresponding to that of the PC card would be needed, as well as an onboard dedicated host processor to run the HCTA software functions described above.

Other Variations

Although the embodiments described have used wireline for the subscriber line and the internal line, the apparatus and method is in principle applicable to a wireless subscriber service, e.g. a fixed access or mobile cellular service, and to an internal line which uses wireless techniques. Hence the terms subscriber telephone line and internal line are intended to encompass these alternatives. Other variations within the scope of the claims will be apparent to persons of average skill in the art, and are not intended to be excluded.

What is claimed is:

1. Apparatus for use at a subscriber site with a subscriber telephone line connecting the subscriber site and a telephone network, for simultaneously sending a telephone call from a PSTN compatible telephone terminal on the subscriber site, and IP packets from a first computer, over the subscriber telephone line, the apparatus comprising:

a converter having a PSTN compatible telephone line interface for coupling to the PSTN compatible telephone terminal, the converter being for converting signals from the PSTN compatible telephone terminal into IP packets representing the telephone call; and a multiplexer coupled to the converter, and having a computer interface for coupling to the first computer, and a subscriber line interface for coupling to the subscriber telephone line, the multiplexer being arranged for sending simultaneously the IP packets representing the telephone call and those from the computer, along the subscriber telephone line;

the apparatus being arranged to handle telephone calls without conversion to IP packets, between the telephone terminal and the subscriber telephone line when the subscriber telephone line is not used for carrying IP packets.

2. The apparatus of claim 1, further comprising a bridge for selectively coupling the subscriber telephone line to an internal telephone line to which the telephone terminal is attached.

3. The apparatus of claim 1, the telephone terminal being coupled to the apparatus via an internal telephone line, the apparatus further comprising a telephone data interface coupled to the multiplexer and arranged for coupling to the internal telephone line, for receiving data from a further computer coupled to the internal telephone line, and distinguishing this data from analog signals from the telephone terminals, the multiplexer being arranged to send the data from the further computer along the subscriber telephone line.

4. The apparatus of claim 1, the telephone terminal being coupled to the apparatus via an internal telephone line, the apparatus further comprising a telephone data interface coupled to the multiplexer and for coupling to the computer interface, for receiving data from a further computer coupled to the internal telephone line, the multiplexer being arranged to send the data from the further computer to the first computer.

5. The apparatus of claim 4, the telephone line interface and the telephone data interface being arranged to communicate over the internal telephone line simultaneously.

6. The apparatus of claim 1, the telephone line interface further comprising an internal line monitor for determining the state of telephony activity from the telephone terminal, the apparatus being arranged to control a telephone call in response to the determination.

7. The apparatus of claim 1 further comprising a subscriber line monitor for determining the state of the subscriber telephone line the apparatus being arranged to control a telephone call in response to the determination.

8. The apparatus of claim 1, further comprising an IP session monitor for determining when there is an IP session already existing, the apparatus being arranged to control a telephone call in response to this determination.

9. The apparatus of claim 8, further comprising an internal line monitor for determining the state of telephony activity from the telephone terminal, and a subscriber line monitor for determining the state of the subscriber telephone line, the apparatus being arranged to control the call additionally on the basis of the outputs of the internal line monitor and the subscriber line monitor.

10. The apparatus of claim 1, the telephone line interface being arranged to determine what number has been dialed, and establish the call as a VoIP call, or establish the call as a conventional telephone call, on the basis of the number dialed.

11. The apparatus of claim 1, further comprising an internal line monitor, for determining the state of telephony activity from the telephone terminal, the apparatus being arranged to send a busy indication in response to an incoming call for the telephone terminal, if an IP session is established and if the internal line monitor determines that the telephone terminal is busy.

12. The apparatus of claim 1 being arranged to prompt a caller of an incoming call to indicate a party that he intends to reach, and the telephone interface being arranged to process the call on the basis of the party indicated by the caller.

13. The apparatus of claim 12, the telephone line interface being arranged to output an alert specific to the party indicated by the caller.

14. The apparatus of claim 1, the multiplexer further comprising a second subscriber line interface for coupling to a second subscriber line.

15. The apparatus of claim 1, the multiplexer further comprising a second subscriber line interface for handling a second connection over the subscriber telephone line, for use with a high bandwidth coupler for multiplexing the second connection over the subscriber telephone line.

16. Apparatus for use at a subscriber site with a subscriber telephone line connecting the subscriber site and a telephone network, for simultaneously receiving a telephone call to a PSTN compatible telephone terminal on the subscriber site, and IP packets directed to a first computer, both sent over the subscriber telephone line, the apparatus comprising:

a converter having a PSTN compatible telephone line interface for coupling to the PSTN compatible telephone terminal, the converter being for converting from IP packets representing the telephone call into signals for the PSTN compatible telephone terminal; and a demultiplexer coupled to the converter, and having a computer interface for coupling to the first computer, and a subscriber line interface for coupling to the subscriber telephone line, the demultiplexer being arranged for receiving simultaneously the IP packets representing the telephone call and those for the computer, over the subscriber telephone line;

the apparatus being arranged to handle telephone calls without conversion to IP packets, between the telephone terminal and the subscriber telephone line when the subscriber telephone line is not used for carrying IP packets.

17. A method of simultaneously sending a telephone call from a PSTN compatible telephone terminal on a subscriber site and IP packets from a first computer, over a subscriber telephone line from the subscriber site, the method comprising the steps of:

converting signals from the PSTN compatible telephone terminal into IP packets representing the telephone call;

using a multiplexer coupled to the converter, and having a computer interface for coupling to the first computer, and a subscriber line interface for coupling to the subscriber telephone line, to send simultaneously the IP packets representing the telephone call and those from the computer, along the subscriber telephone line; and handling telephone calls without conversion to IP packets, between the telephone terminal and the subscriber telephone line when the subscriber telephone line is not used for carrying IP packets.

18. Software stored on a computer readable medium for carrying out a method of simultaneously sending a telephone call from a PSTN compatible telephone terminal on a subscriber site and IP packets from a first computer, over a subscriber telephone line from the subscriber site, the method comprising the steps of:

converting signals from the PSTN compatible telephone terminal into IP packets representing the telephone call;

using a multiplexer coupled to the converter, and having a computer interface for coupling to the first computer, and a subscriber line interface for coupling to the subscriber telephone line, to send simultaneously the IP packets representing the telephone call and those from the computer, along the subscriber telephone line; and handling telephone calls without conversion to IP packets, between the telephone terminal and the subscriber telephone line when the subscriber telephone line is not used for carrying IP packets.

* * * * *